United States Patent
Jin et al.

(10) Patent No.: US 11,553,459 B2
(45) Date of Patent: Jan. 10, 2023

(54) RESOURCE ALLOCATION METHOD AND DEVICE FOR SUPPORTING VEHICLE COMMUNICATION IN NEXT GENERATION MOBILE COMMUNICATION SYSTEM

(71) Applicant: Samsung Electronics Co., Ltd., Suwon-si (KR)

(72) Inventors: Seungri Jin, Suwon-si (KR); Sangyeob Jung, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/047,200

(22) PCT Filed: Apr. 15, 2019

(86) PCT No.: PCT/KR2019/004482
§ 371 (c)(1),
(2) Date: Oct. 13, 2020

(87) PCT Pub. No.: WO2019/199140
PCT Pub. Date: Oct. 17, 2019

(65) Prior Publication Data
US 2021/0127362 A1    Apr. 29, 2021

(30) Foreign Application Priority Data

Apr. 13, 2018   (KR) ................. 10-2018-0043210

(51) Int. Cl.
*H04W 72/02*   (2009.01)
*H04W 76/11*   (2018.01)
(Continued)

(52) U.S. Cl.
CPC ............. *H04W 72/02* (2013.01); *H04W 4/40* (2018.02); *H04W 72/0446* (2013.01);
(Continued)

(58) Field of Classification Search
CPC ... H04W 72/02; H04W 4/40; H04W 72/0446; H04W 72/0453; H04W 76/11; H04W 80/02; H04W 92/12; H04W 72/04
See application file for complete search history.

(56) References Cited

U.S. PATENT DOCUMENTS

2016/0143078 A1   5/2016  Jeong
2016/0192427 A1*  6/2016  Yun ..................... H04W 76/14
                                                                 370/329
(Continued)

FOREIGN PATENT DOCUMENTS

KR   10-2019-0036251 A   4/2019
RU        2 614 042 C1   3/2017
WO       2016/163817 A1  10/2016

OTHER PUBLICATIONS

3GPP TS 38.321 V15.1.0 (Mar. 2018) ; 3rd Generation Partnership Project; Technical Specification Group Radio Access Network; NR; Medium Access Control (MAC) protocol specification; (Release 15); Published Apr. 2, 2018. (Year: 2018).*
(Continued)

*Primary Examiner* — Mohammed S Chowdhury
(74) *Attorney, Agent, or Firm* — Jefferson IP Law, LLP

(57) ABSTRACT

Disclosed are: a communication technique for merging, with IOT technology, a 5G communication system for supporting a data transmission rate higher than that of a 4G system; and a system therefor. The present disclosure can be applied to intelligent services (for example, smart home, smart building, smart city, smart car or connected car, healthcare, digital education, retail, security, and safety-related services, and the like) based on 5G communication technology and IoT-related technology. A method of a terminal in a wireless communication system, according to the present invention, comprising: receiving system information including a V2X parameter; receiving a data packet based on the V2X param- (Continued)

eter; and updating a state variable on the data packet when the data packet is related to a new service, wherein a sequence number included in the state variable is updated based on a sequence number of a data packet received for the first time.

10 Claims, 23 Drawing Sheets

(51) Int. Cl.
  *H04W 4/40* (2018.01)
  *H04W 72/04* (2009.01)
  *H04W 80/02* (2009.01)
  *H04W 92/12* (2009.01)

(52) U.S. Cl.
  CPC ........ *H04W 72/0453* (2013.01); *H04W 76/11* (2018.02); *H04W 80/02* (2013.01); *H04W 92/12* (2013.01)

(56) References Cited

U.S. PATENT DOCUMENTS

| | | | |
|---|---|---|---|
| 2016/0219132 A1* | 7/2016 | Lee | H04L 69/22 |
| 2016/0338092 A1* | 11/2016 | Agiwal | H04W 76/14 |
| 2017/0094656 A1* | 3/2017 | Chen | H04W 76/14 |
| 2017/0245310 A1 | 8/2017 | Chandramouli et al. | |
| 2017/0288886 A1 | 10/2017 | Atarius et al. | |
| 2018/0047107 A1 | 2/2018 | Perl et al. | |
| 2018/0049073 A1 | 2/2018 | Dinan et al. | |
| 2019/0053098 A1* | 2/2019 | Jo | H04W 80/08 |
| 2019/0053310 A1* | 2/2019 | Wu | H04W 72/0446 |
| 2020/0137798 A1* | 4/2020 | Bergquist | H04W 76/27 |
| 2020/0260496 A1 | 8/2020 | Jin et al. | |
| 2021/0007177 A1* | 1/2021 | Li | H04W 76/11 |

OTHER PUBLICATIONS

3GPP TSG-RAN WG2 Meeting #85bis; R2-141491, Source: ZTE; Title: MAC PDU format for D2D communication; Valencia, Spain, Mar. 31-Apr. 4, 2014. (Year: 2014).*
3GPP TSG-RAN WG2 Meeting #87bis; Tdoc R2-144470, Source: Ericsson, Title: ProSe Layer-2 Identifiers, Shanghai, China, Oct. 6-10, 2014. (Year: 2014).*
3GPP TSG-RAN WG2 Meeting #88; R2-145064, Source: Ericsson, Title: Introduction of ProSe, San Francisco, USA, Nov. 17-21, 2014. (Year: 2014).*
Extended European Search Report dated Apr. 26, 2021, issued in European Application No. 19785041.5.
Mediatek Inc., RLC AM state variables, R2-1707259, 3GPP TSG RAN WG2 NR Ad Hoc #2, Jun. 17, 2017, Qingdao, China.
Russian Office Action dated Dec. 10, 2021, issued in Russian Patent Application No. 2020133481.

* cited by examiner

FIG. 1E
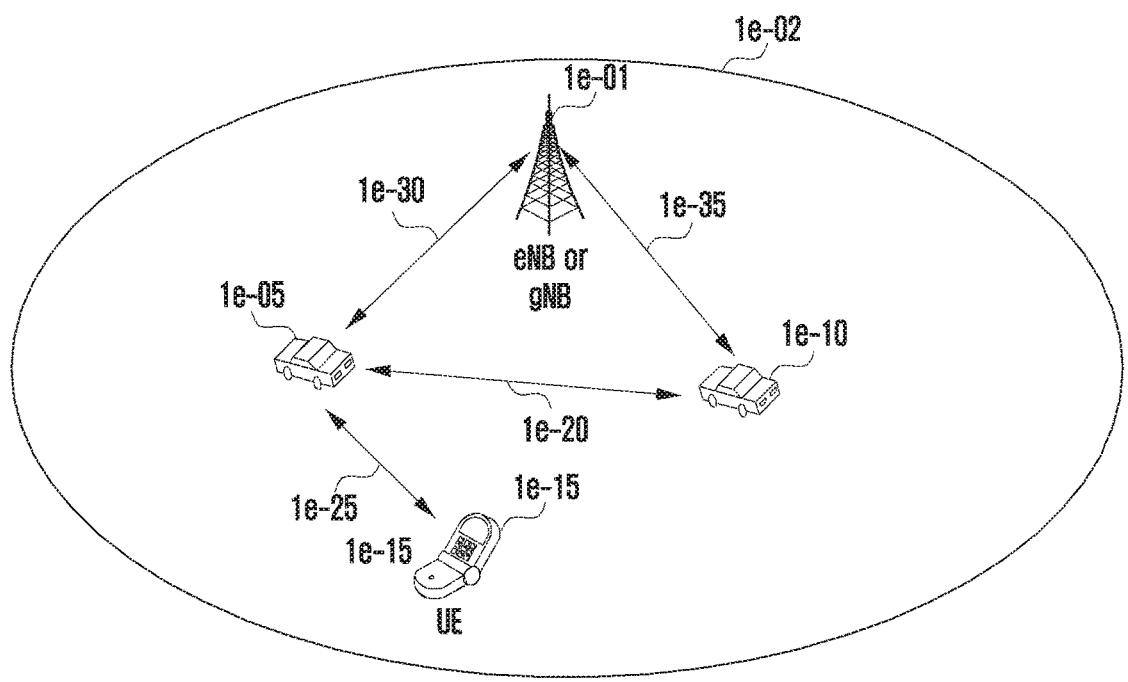
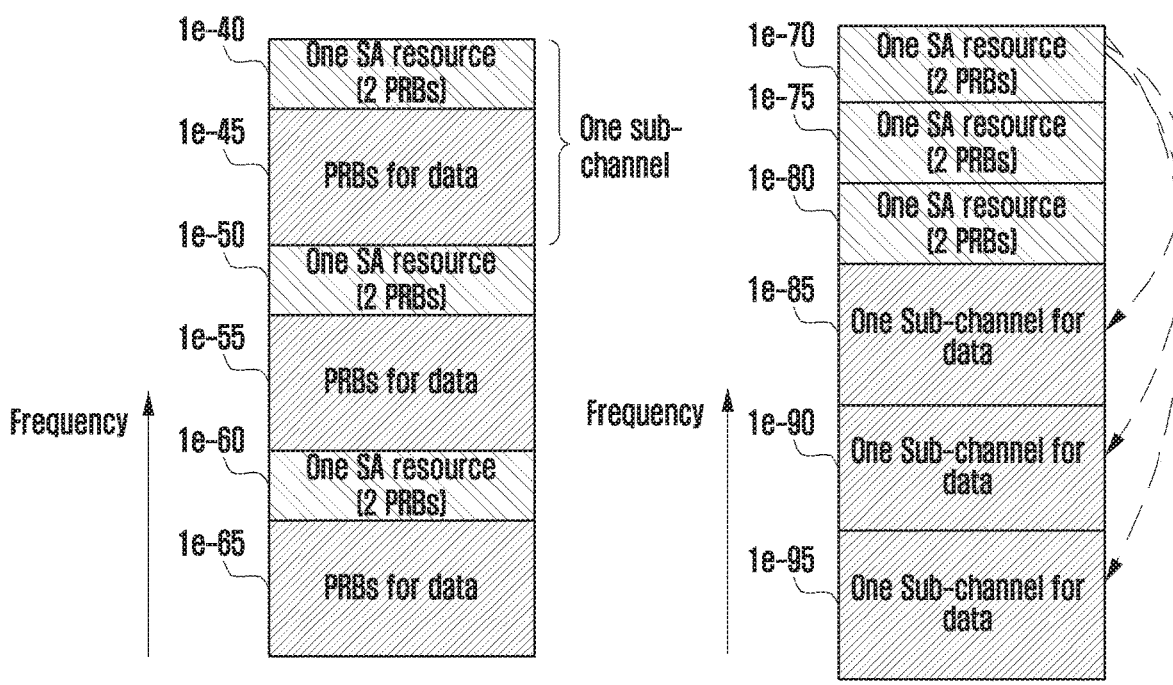

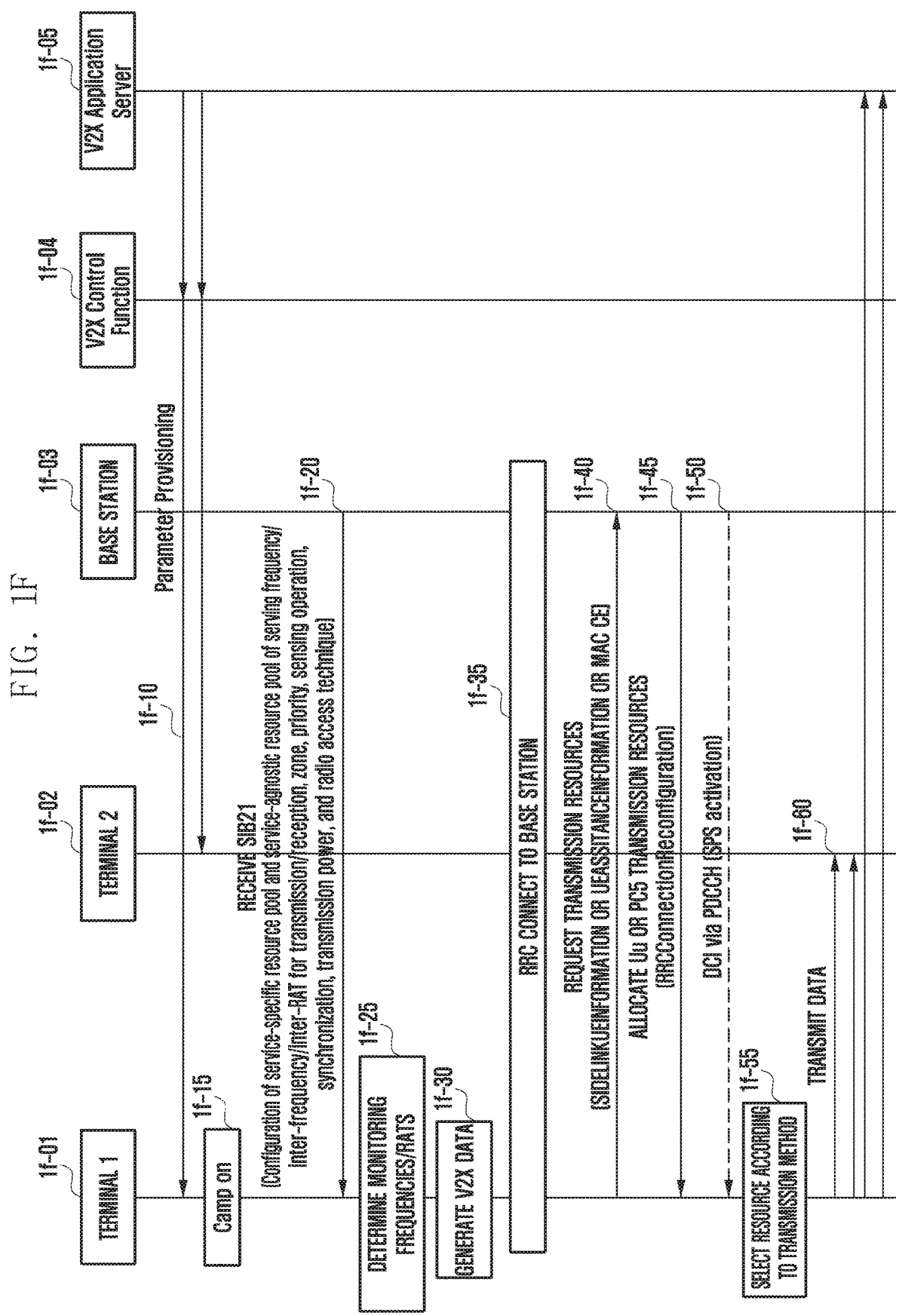

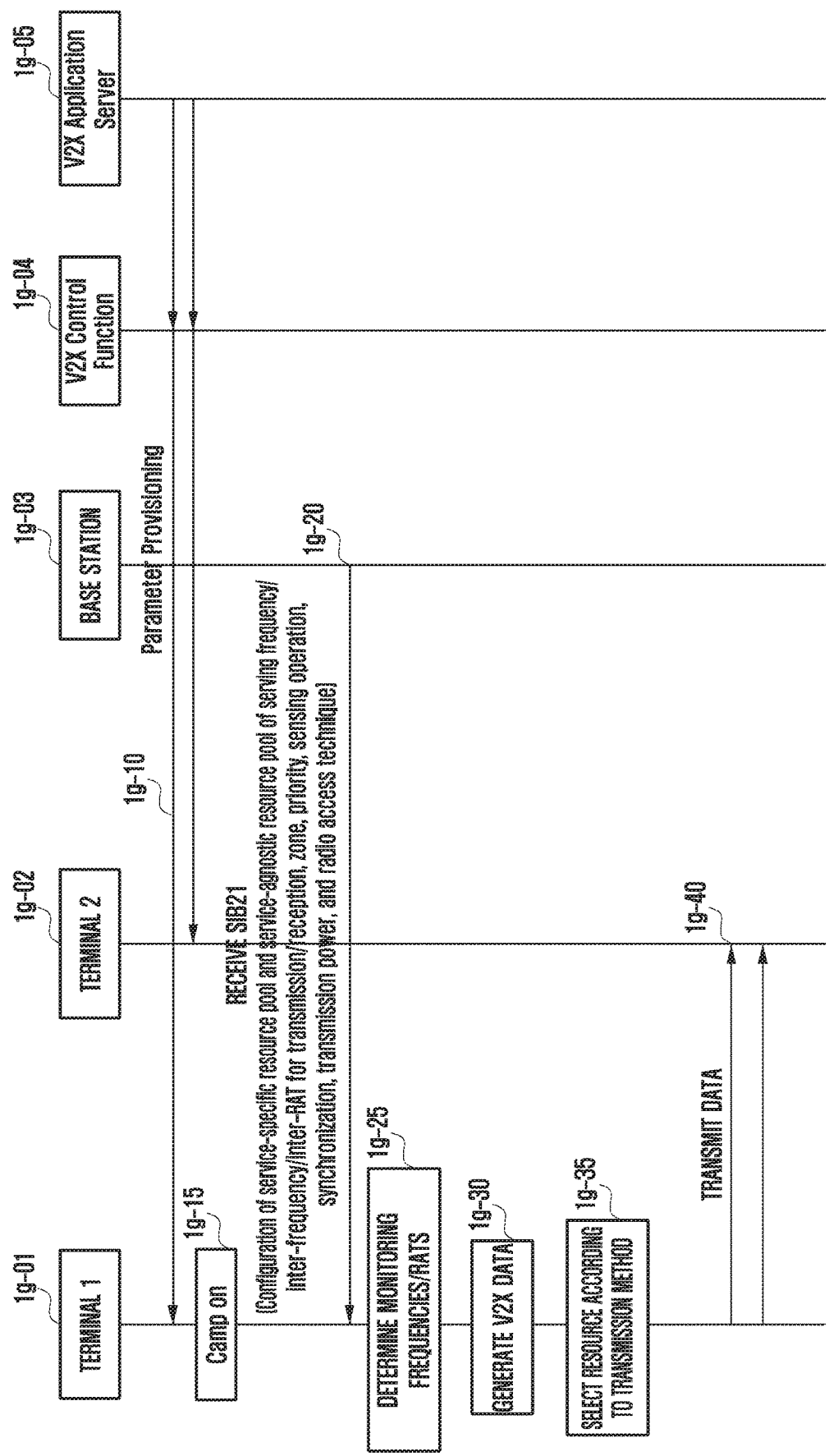

FIG. 2E
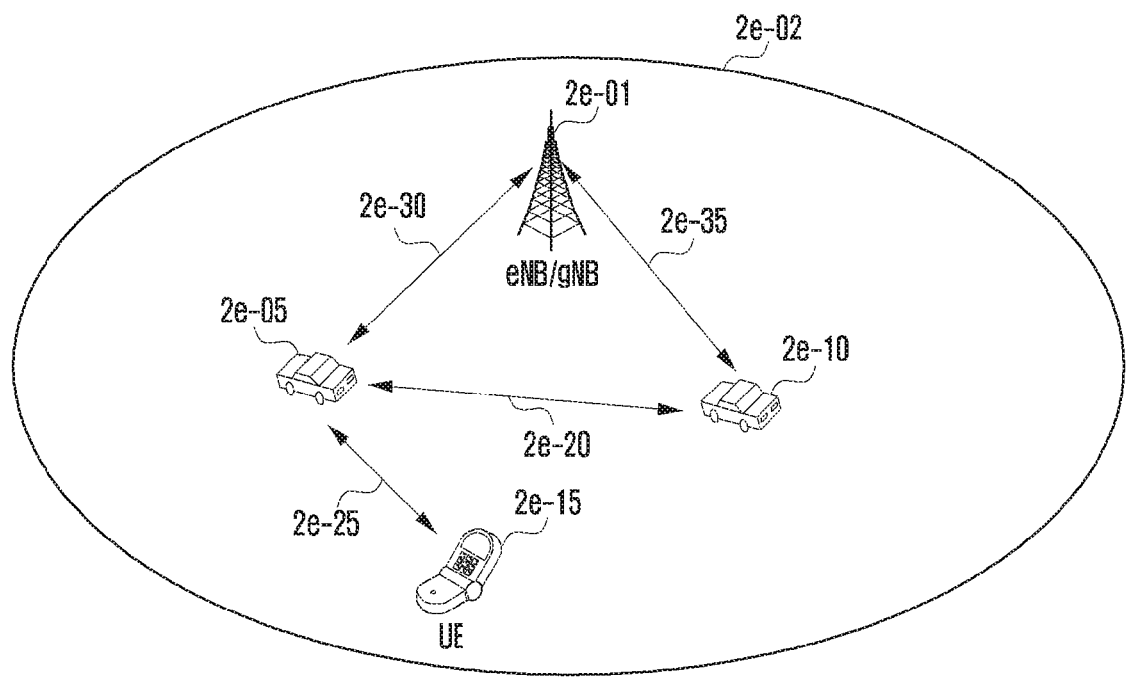
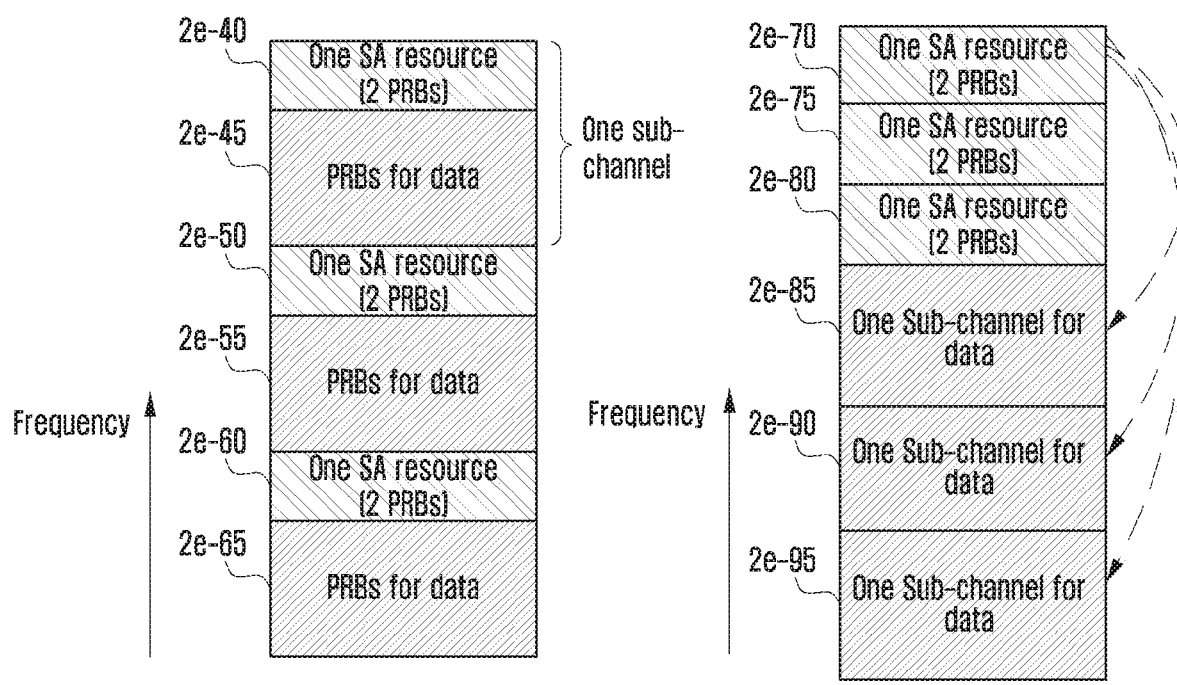

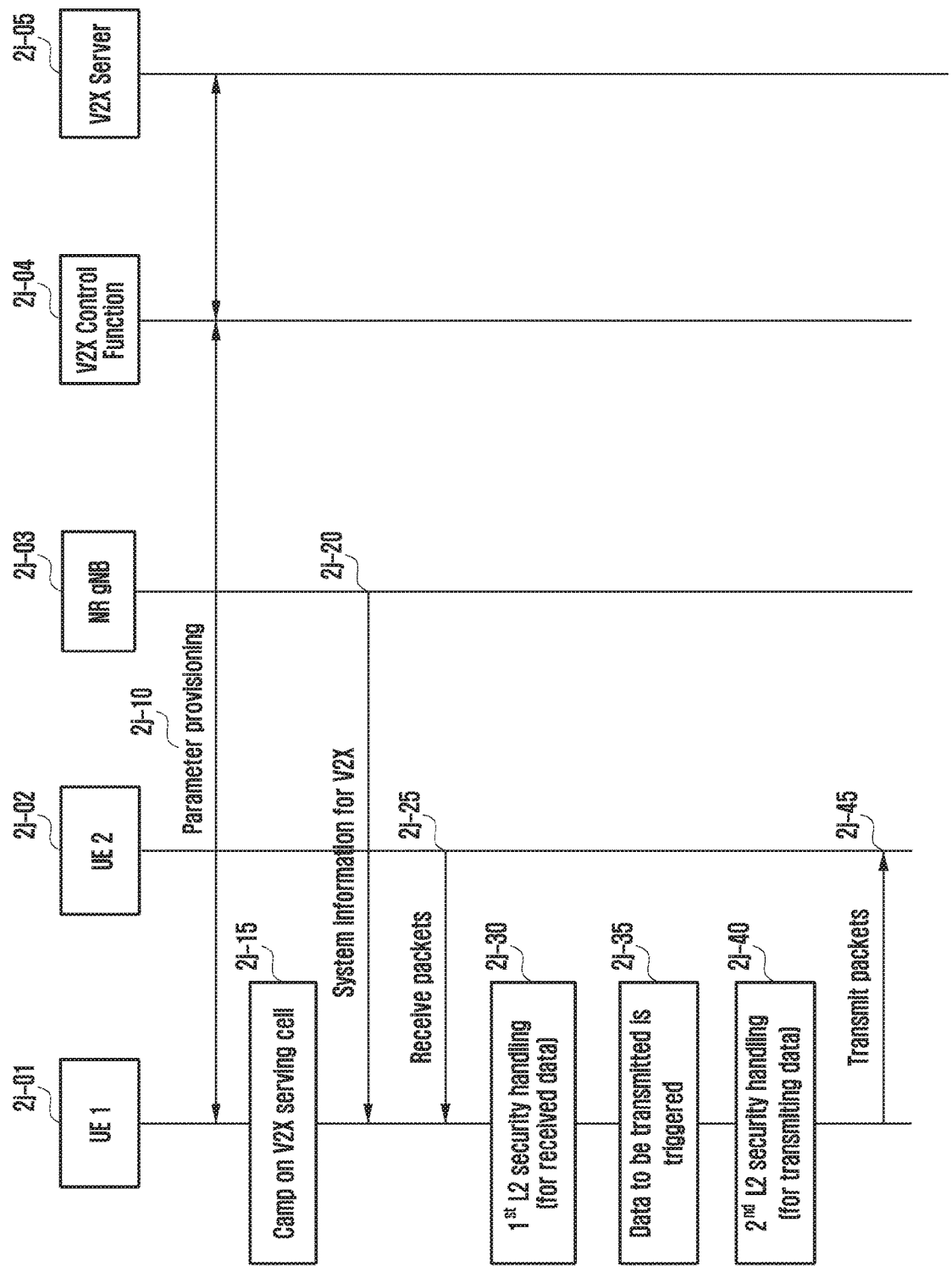

RESOURCE ALLOCATION METHOD AND DEVICE FOR SUPPORTING VEHICLE COMMUNICATION IN NEXT GENERATION MOBILE COMMUNICATION SYSTEM

TECHNICAL FIELD

The disclosure defines a service-specific resource pool to support various vehicle-to-everything (V2X) services in a next-generation mobile communication system. In addition, the disclosure includes a method of selecting a resource pool by an LTE terminal or an NR terminal supporting V2X when a service-specific resource pool and a service-agnostic resource pool coexist, and monitoring and data transmission procedures accordingly.

In addition, the disclosure relates to a mobile communication system and, more particularly, includes an overall process in the user plane of a terminal supporting vehicle-to-everything (V2X) services newly defined in NR.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Meanwhile, the need for a method for supporting vehicle-to-everything (V2X) services in a 5G communication system has emerged.

DESCRIPTION OF THE INVENTION

Technical Problem

The disclosure is intended to support various vehicle-to-everything (V2X) services by defining a service-specific resource pool in a next-generation mobile communication system and designing the operations of a terminal and a base station accordingly.

In addition, in order to satisfy the new requirements in NR apart from the V2X operation in the existing LTE, it is necessary to configure the operation on the basic user plane required by introducing an upgraded scenario and NR V2X operation that satisfies the requirements. The operation on the user plane includes tasks such as MAC PDU format determination, radio bearer management and initial configuration, and security key configuration.

Solution to Problem

In order to solve the above problems, in a wireless communication system, a method of a terminal according to the disclosure may include: receiving system information including V2X parameters; receiving a data packet based on the V2X parameter; and updating a state variable for the data packet if the data packet is related to a new service, wherein a sequence number included in the state variable is updated based on the sequence number of the first received data packet.

In order to solve the above problems, in a wireless communication system, a terminal according to the disclosure may include a transceiver; and a controller configured to: receive system information including V2X parameters; receive a data packet based on the V2X parameter; and update a state variable for the data packet if the data packet is related to a new service, wherein a sequence number included in the state variable is updated based on the sequence number of the first received data packet.

Advantageous Effects of Invention

According to an embodiment of the disclosure, a service-specific resource pool is defined to support various vehicle-to-everything (V2X) services in a next-generation mobile communication system. In addition, the disclosure proposes an overall operation method and device for the terminal and the base station, based on the service-specific resource pool proposed above. Therefore, the base station can support various V2X services to the terminal by efficiently managing resources with low signaling overhead to the LTE terminal or NR terminal supporting V2X services, and the terminal can efficiently transmit and receive messages according to the V2X service.

According to another embodiment of the disclosure, by specifying features on the user plane for supporting NR V2X services, it is possible to clarify the operation of NR V2X and design to operate, based on the NR system. Accordingly, it is possible to efficiently provide V2X services in the existing NR system.

BRIEF DESCRIPTION OF DRAWINGS

FIG. 1E is a view illustrating V2X communication in a next-generation mobile communication system to which the disclosure is applied;

FIG. 1F is a view illustrating a procedure for monitoring and transmitting data of a V2X terminal operating in mode 3 when a service-specific resource pool and a service-agnostic resource pool coexist in a next-generation mobile communication system;

FIG. 1G is a view illustrating a data transmission procedure of a V2X terminal operating in mode 4 when a service-specific resource pool and a service-agnostic resource pool coexist in a next-generation mobile communication system;

FIG. 1I is a block diagram showing the configuration of a base station according to the disclosure;

FIG. 2E is a view illustrating V2X communication within the cellular system of the disclosure;

FIG. 2I is a view illustrating sidelink radio bearer management, encryption, and decryption methods applied to the NR V2X system proposed in the disclosure;

FIG. 2J is a view illustrating an overall operation of transmitting and receiving data in a user plane in the NR V2X system proposed by the disclosure;

MODE FOR THE INVENTION

First Embodiment

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description of the disclosure, a detailed description of known functions or configurations incorporated herein will be omitted when it may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB" for the convenience of description. That is, a base station described as "eNB" may indicate "gNB".

Figure 1A:
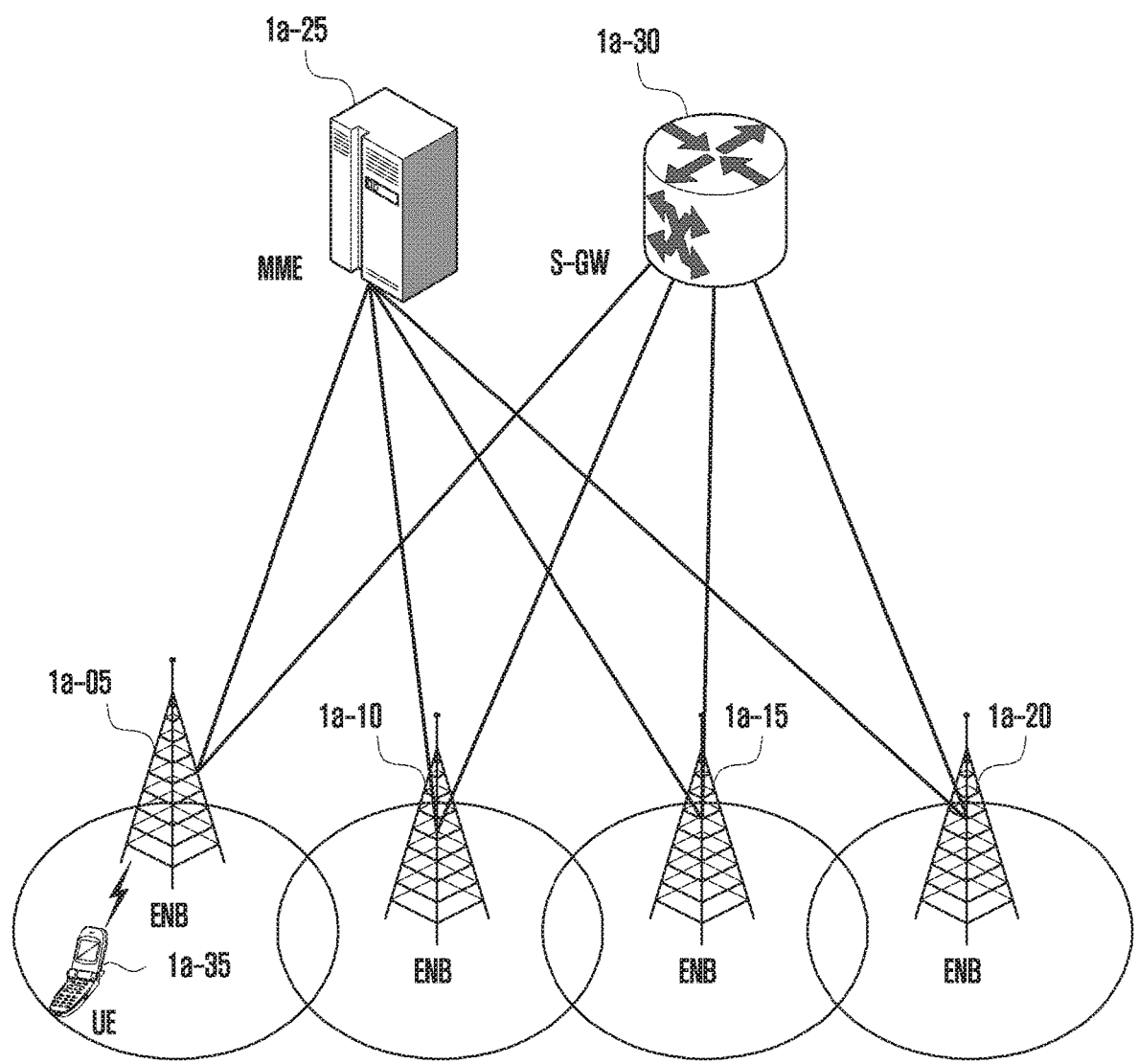
FIG. 1A is a view illustrating a structure of an LTE system to which the disclosure can be applied.

FIG. 1A is a view illustrating a structure of an LTE system to which the disclosure can be applied.

Referring to FIG. 1A, as illustrated, a radio access network of the LTE system may include evolved node Bs (hereinafter referred to as ENB, Node B, or base station) 1a-05, 1a-10, 1a-15, and 1a-20, a mobility management entity (MME) 1a-25, and a serving-gateway (S-GW) 1a-30. A user equipment (hereinafter, referred to as "UE" or "terminal") 1a-35 may access an external network through the ENB 1a-05 1a-20 and the S-GW 1a-30.

In FIG. 1A, the ENBs 1a-05 to 1a-20 correspond to the existing node B of the UMTS system. The ENB is connected to the UEs 1a-35 through a radio channel and performs a more complex role than the existing node B. In the LTE system, all user traffic, including real-time services such as voice over IP (VoIP) through the Internet protocol, are serviced through a shared channel, a device for scheduling by collecting state information such as buffer status, available transmission power status, and channel status of UEs is required, and ENBs 1a-05 to 1a-20 are in charge of the device. One ENB typically controls multiple cells. For example, in order to implement a transmission rate of 100 Mbps, the LTE system uses an orthogonal frequency division multiplexing (OFDM) as a radio access technology in, for example, a 20 MHz bandwidth. In addition, an adaptive modulation & coding (hereinafter, referred to as "AMC") scheme is applied to determine a modulation scheme and a channel coding rate according to a channel state of the terminal.

The S-GW 1a-30 is a device that provides a data bearer, and generates or removes a data bearer under the control of the MME 1a-25. The MME is a device responsible for various control functions as well as mobility management functions for a terminal, and is connected to a plurality of base stations.

Figure 1B:
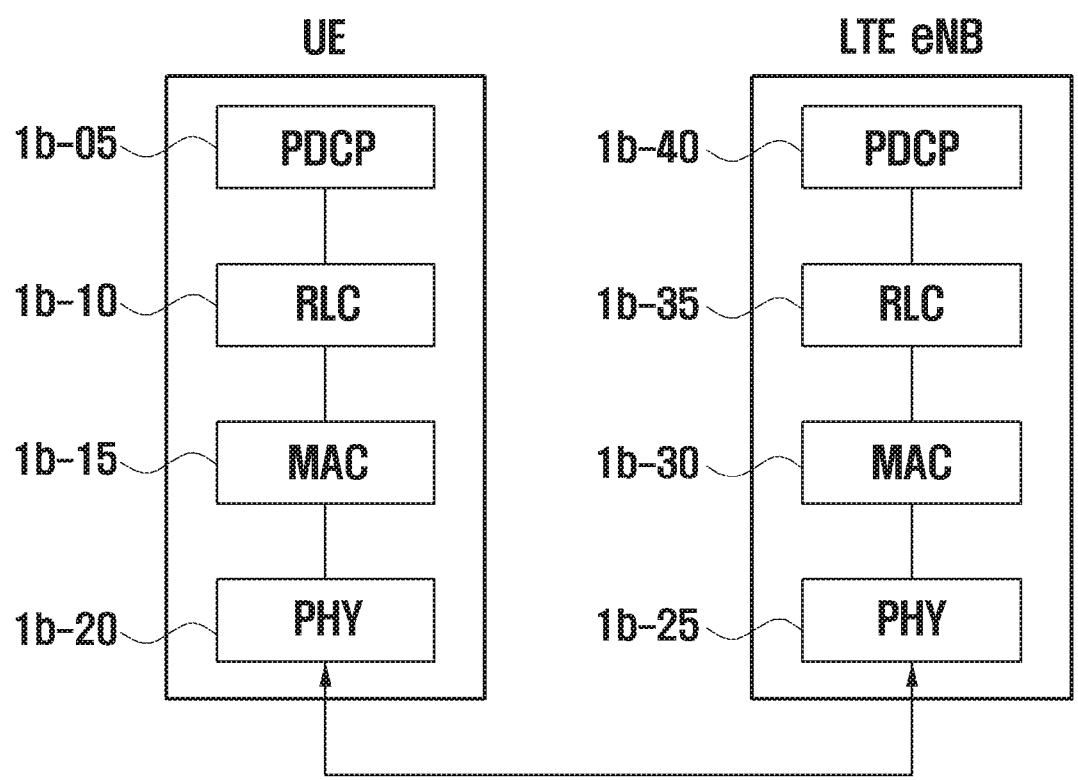
FIG. 1B is a view illustrating a radio protocol structure in an LTE system to which the disclosure can be applied.

FIG. 1B is a view illustrating a radio protocol structure in an LTE system to which the disclosure can be applied.

Referring to FIG. 1B, the radio protocol of the LTE system is composed of a packet data convergence protocols (PDCP) 1b-05, 1b-40, a radio link control (RLC) 1b-10, 1b-35, and a medium access control (MAC) 1b-15, 1b-30, in the terminal and eNB, respectively.

Packet data convergence protocols (PDCPs) 1b-05 and 1b-40 are in charge of operations such as IP header compression/restore. The main functions of PDCP are summarized as follows.

Header compression and decompression: ROHC only
    Transfer of user data
    In-sequence delivery of upper layer PDUs at PDCP re-establishment procedure for RLC AM
    For split bearers in DC (only support for RLC AM): PDCP PDU routing for transmission and PDCP PDU reordering for reception
    Duplicate detection of lower layer SDUs at PDCP re-establishment procedure for RLC AM
    Retransmission of PDCP SDUs at handover and, for split bearers in DC, of PDCP PDUs at PDCP data-recovery procedure, for RLC AM
    Ciphering and deciphering
    Timer-based SDU discard in uplink The radio link controls (RLCs) 1b-10 and 1b-35 reconstruct a PDCP packet data unit (PDU) to an appropriate size and performs an ARQ operation. The main functions of RLC are summarized as follows.

Transfer of upper layer PDUs
    Error Correction through ARQ (only for AM data transfer)
    Concatenation, segmentation, and reassembly of RLC SDUs (only for UM and AM data transfer)
    Re-segmentation of RLC data PDUs (only for AM data transfer)
    Reordering of RLC data PDUs (only for UM and AM data transfer)
    Duplicate detection (only for UM and AM data transfer)
    Protocol error detection (only for AM data transfer)
    RLC SDU discard (only for UM and AM data transfer)
    RLC re-establishment The MACs 1b-15 and 1b-30 are connected to several RLC layer entities configured in one UE, and perform an operation of multiplexing RLC PDUs to MAC PDUs and demultiplexing RLC PDUs from MAC PDUs. The main functions of MAC are summarized as follows.

Mapping between logical channels and transport channels
    Multiplexing/demultiplexing of MAC SDUs belonging to one or different logical channels into/from transport blocks (TB) delivered to/from the physical layer on transport channels
    Scheduling information reporting
    Error correction through HARQ
    Priority handling between logical channels of one UE
    Priority handling between UEs by means of dynamic scheduling
    MBMS service identification
    Transport format selection
    Padding The physical layers 1b-20 and 1b-25 channel-code and modulate upper layer data, convert the same into OFDM symbols, and transmit the same to the radio channel, or demodulate OFDM symbols received through the radio channel, decode the channel, and deliver the same to the upper layer.

Figure 1C:
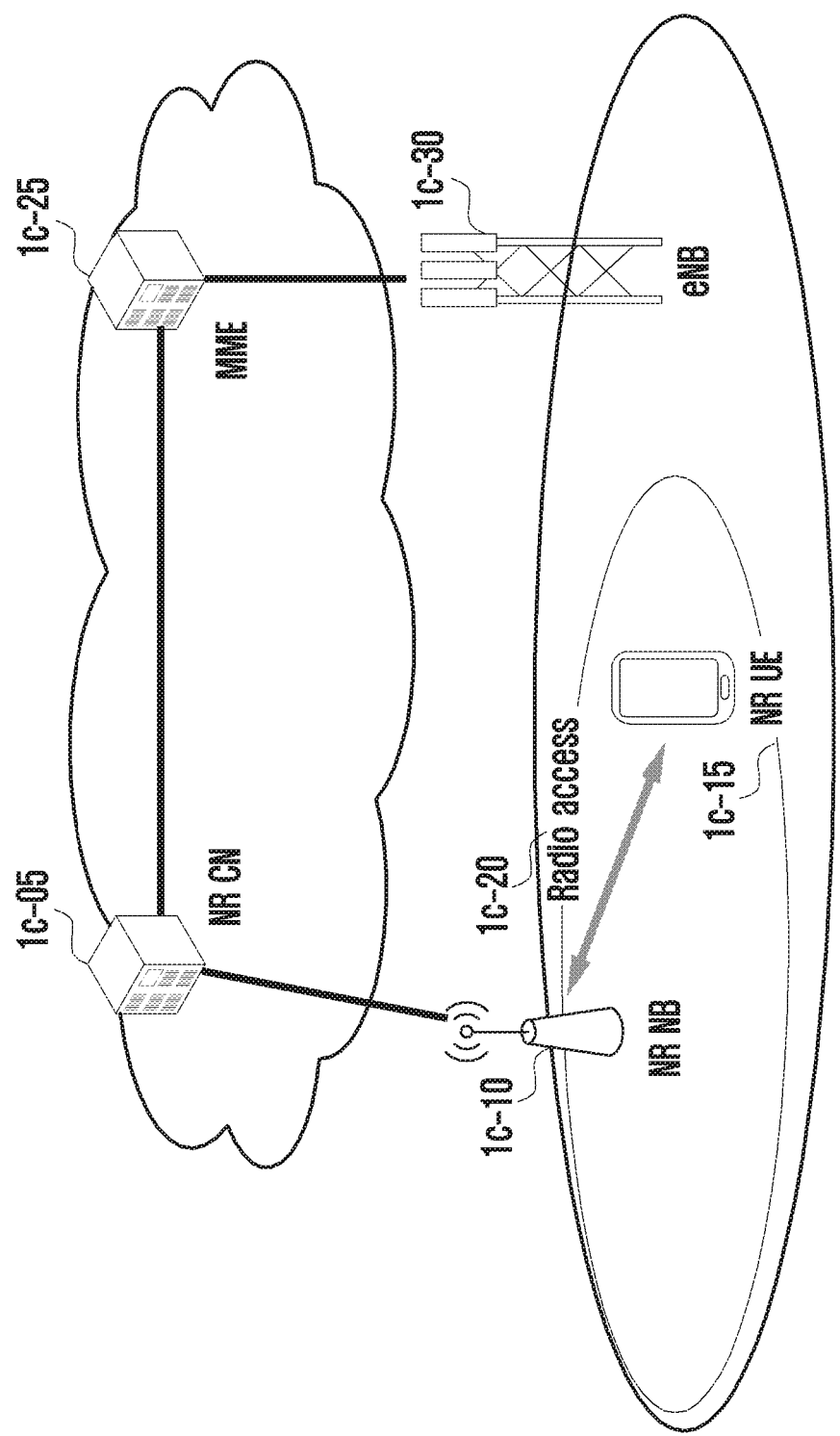
FIG. 1C is a view illustrating the structure of a next-generation mobile communication system to which the disclosure can be applied.

FIG. 1C is a view illustrating the structure of a next-generation mobile communication system to which the disclosure can be applied;

Referring to FIG. 1c, as illustrated, the radio access network of the next-generation mobile communication system (hereinafter, referred to as "NR" or "5G") includes a next-generation base station (new radio node B, hereinafter referred to as "NR gNB" or "NR base station") 1c-10 and new radio core network (NR CN) 1c-05. The user equipment (new radio user equipment, hereinafter, referred to as "NR UE" or "terminal") 1c-15 accesses an external network through the NR gNB 1c-10 and NR CN 1c-05.

In FIG. 1C, the NR gNB 1c-10 corresponds to the eNB of the existing LTE system. The NR gNB is connected to the NR UE 1c-15 through a radio channel and can provide a service superior to that of the existing Node B. In the next-generation mobile communication system, all user traffic is serviced through a shared channel, so a device that collects and schedules status information such as buffer status, available transmission power status, and channel status of UEs is required, and the NR NB 1c-10 is in charge. One NR gNB typically controls multiple cells. In order to implement ultra-high-speed data transmission compared to the current LTE, it can have more than the existing maximum bandwidth, and a beamforming technology may be additionally grafted using orthogonal frequency division multiplexing (OFDM) as a wireless access technology. In addition, an adaptive modulation coding (AMC) method is applied to determine a modulation scheme and a channel coding rate according to a channel state of the terminal.

The NR CN 1c-05 performs functions such as mobility support, bearer configuration, and QoS configuration. The NR CN is a device responsible for various control functions as well as mobility management functions for a terminal, and is connected to a plurality of base stations. In addition, the next-generation mobile communication system can be interlocked with the existing LTE system, and the NR CN is connected to the MME 1c-25 through a network interface. The MME is connected to the existing eNB 1c-30.

Figure 1D:
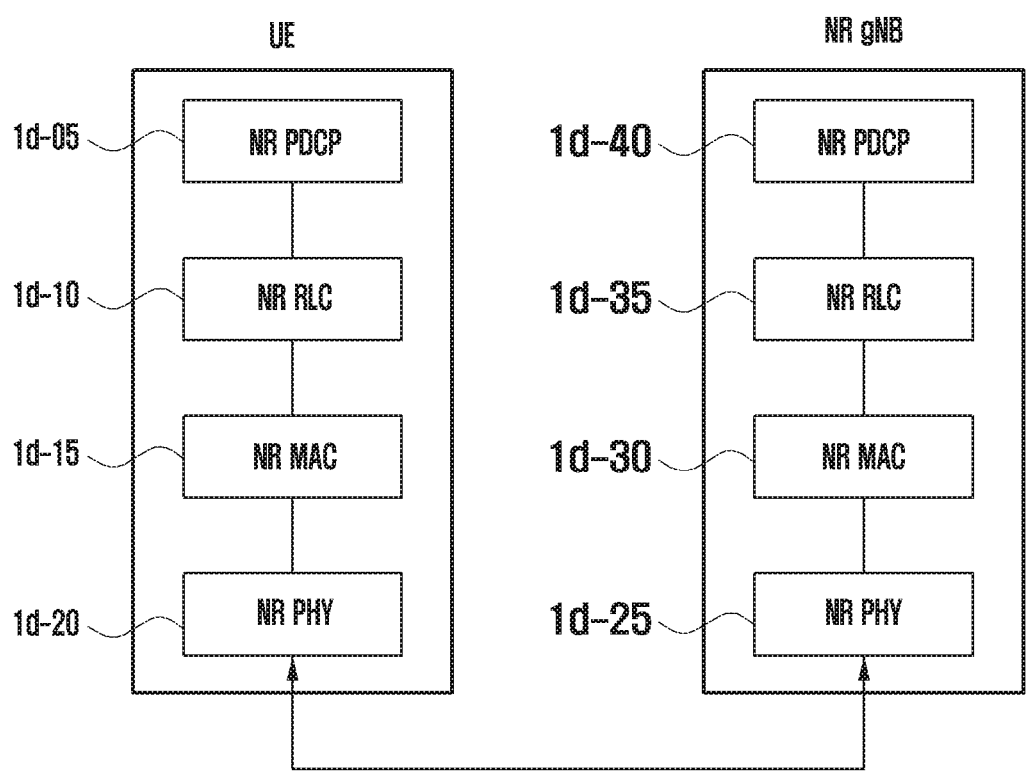
FIG. 1D is a view illustrating a radio protocol structure of a next-generation mobile communication system to which the disclosure can be applied.

FIG. 1D is a view illustrating a radio protocol structure of a next-generation mobile communication system to which the disclosure can be applied.

Referring to FIG. 1D, the radio protocol of the next-generation mobile communication system is composed of an NR PDCP 1d-05, 1d-40, an NR RLC 1d-10, 1d-35, an NR MAC 1d-15, 1d-30 in the terminal and the NR base station, respectively. The main functions of the NR PDCPs 1d-05, 1d-40 may include some of the following functions.

Header compression and decompression: ROHC only
    Transfer of user data
    In-sequence delivery of upper layer PDUs
    Out-of-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink In the above, the reordering function of the NR PDCP device refers to a function of reordering PDCP PDUs received from a lower layer in order based on a PDCP sequence number (SN), and may include a function of delivering data to an upper layer in a reordered order, may include a function of immediately delivering data without considering the order, may include a function of reordering the order and recording the lost PDCP PDUs, may include a function to report the status of the lost PDCP PDUs to the transmitting side, and may include a function to request retransmission of the lost PDCP PDUs.

The main functions of the NR RLCs 1d-10, 1d-35 may include some of the following functions.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the above, the in-sequence delivery function of the NR RLC device refers to a function of sequentially delivering RLC SDUs received from a lower layer to an upper layer, and may include a function of reassembling and delivering when one RLC SDU is originally divided into multiple RLC SDUs and received, may include a function of rearranging the received RLC PDUs based on an RLC sequence number (SN) or a PDCP sequence number (SN), may include a function of reordering the order to record lost RLC PDUs, may include a function of reporting the status of lost RLC PDUs to the transmitting side, may include a function of requesting retransmission of lost RLC PDUs, may include a function of sequentially delivering only RLC SDUs prior to the lost RLC SDU to an upper layer when there is a lost RLC SDU, may include a function of sequentially delivering all RLC SDUs received before the timer starts to an upper layer if a predetermined timer expires even if there is a lost RLC SDU, or may include a function of sequentially delivering all RLC SDUs received so far to an upper layer if a predetermined timer expires even if there is a lost RLC SDU. In addition, the RLC PDUs may be processed in the order of reception (regardless of the order of serial number and sequence number, in the order of arrival) and delivered to the PDCP device regardless of the order (out-of-sequence delivery), and in the case of a segment, segments stored in a buffer or to be received in the future may be received, reconstructed into one complete RLC PDU, processed, and delivered to the PDCP device. The NR RLC layer may not include a concatenation function, and the function may be performed in the NR MAC layer or may be replaced by a multiplexing function of the NR MAC layer.

In the above, the out-of-sequence delivery function of the NR RLC device refers to a function of directly delivering RLC SDUs received from a lower layer to an upper layer regardless of order, and may include a function of reassembling and delivering when one RLC SDU is originally divided into multiple RLC SDUs and received, and may include a function of storing the RLC SNs or PDCP SNs of received RLC PDUs, sorting the order, and recording the lost RLC PDUs.

The NR MACs 1d-15 and 1d-30 may be connected to several NR RLC layer entities configured in one terminal, and the main functions of the NR MAC may include some of the following functions.

Mapping between logical channels and transport channels
Multiplexing/demultiplexing of MAC SDUs
Scheduling information reporting
error correction through HARQ
Priority handling between logical channels of one UE
Priority handling between UEs by means of dynamic scheduling
MBMS service identification
Transport format selection
Padding The NR PHY layers 1d-20, 1d-25 may channel-code and modulate upper layer data, convert the same into OFDM symbols, and transmit the same to the radio channel, or demodulate and channel-decode OFDM symbols received through the radio channel and transmit the same to the upper layer.

In the disclosure, a service-specific resource pool is defined to support various vehicle-to-everything (V2X) services in a next-generation mobile communication system. In particular, in next-generation mobile communication systems, since requirements are very different according to usage cases, the service-specific resource pool is defined in the serving cell and inter-frequency to support various V2X services. In addition, the disclosure proposes a method for an LTE terminal or an NR terminal supporting V2X services to select a resource pool when a service-specific resource pool and a service-agnostic resource pool proposed above coexist, and proposes a monitoring and data transmission procedure according to the method.

Table 1 shows the classification of the type, range, and data rate for each V2X service in the next generation mobile communication system to which the disclosure is applied.

Referring to Table 1, unlike the existing LTE systems (releases 14/15 V2X), which support only uniform V2X services such as low data rate such as basic safety message (BSM), cooperative awareness message (CAM), decentralized environmental notification message (DENM), one-way P2X service, etc., wide communication or transmission range, and public services, the next-generation mobile communication systems are expected to support various data rates, communication and transmission areas, and public or private services due to the introduction of new services such as advanced driving, extended sensor, and platooning. Accordingly, the disclosure proposes a method of classifying V2X services as shown in Table 1 below, based on the requirements and use cases for each service. The table proposed as follows refers to 3GPP standard TR 22.886 "Study on enhancement of 3GPP Support for 5G V2X services".

TABLE 1

| Type | Range | Data Rate | Usage |
| --- | --- | --- | --- |
| Rel-14/-15 V2X | Public | High | Low | BSM, CAM, DENM, P2X |
| Advanced Driving | Public | Medium | Medium | Information sharing for automated driving, Intersection safety information, Copperative lane change, etc |
| Extended Sensor | Public | Low (adjacent cars) | High | |
| Platooning | Private/ Public | Medium: Leader -> follower, follower -> leader Low: follower <-> follower | Medium | |

FIG. 1E is a view illustrating V2X communication in a next-generation mobile communication system to which the disclosure is applied.

V2X collectively refers to communication technology through all interfaces with the vehicle, and may include vehicle-to-vehicle (V2V), vehicle-to-infrastructure (V2I), vehicle-to-pedestrian (V2P), vehicle-to-network (V2N), and the like, according to the shape and communication components. The V2P and V2V basically follow the structure and operation principle of Rel-13 device-to-device (D2D).

The base station 1e-01 may communicate with at least one vehicle terminal 1e-05, 1e-10 and a pedestrian portable terminal 1e-15 located in the cell 1e-02 supporting V2X. For example, the vehicle terminal 1e-05 may perform cellular communication with the base station 1e-01 using the vehicle terminal-base station link (Uu) 1e-30, 1e-35, and the vehicle terminal 1e-05 may perform device-to-device (D2D) using a side link PC5 1e-20, 1e-25 with another vehicle terminal 1e-10 or a pedestrian portable terminal 1e-15.

In order for the vehicle terminal 1e-05 and another vehicle 1e-10, or the vehicle terminals 1e-05 and 1e-10 and the pedestrian mobile terminal 5c-15 to directly transmit and receive information by using the sidelinks 1e-20 and 1e-25, the base station needs to allocate a resource pool that can be used for sidelink communication. According to how the base station allocates resources to the terminal, the allocation can be divided into scheduled resource allocation (mode 3) and UE autonomous resource allocation (mode 4).

The scheduled resource allocation is a method in which the base station allocates resources used for sidelink transmission to RRC-connected terminals in a dedicated scheduling scheme. The above method is effective for interference management and resource pool management (dynamic allocation, semi-persistent transmission) because the base station can manage the resources of the sidelink. In addition, in the case of scheduled resource allocation (mode 3) in which the base station allocates and manages resources for V2X, when the RRC connected terminal has data to be transmitted to other terminals, the terminal may request resource allocation from the base station using an RRC message or a MAC control element (hereinafter, referred to as "CE"). Here, the RRC message may be a SidelinkUEInformation or UEAssistanceInformation message. Meanwhile, the MAC CE may, as an example, be a buffer status report MAC CE of a new format (including at least an indicator indicating that a buffer status report for V2P communication and information on the size of data buffered for D2D communication). For detailed format and contents of the buffer status report used in 3GPP, refer to 3GPP standard TS36.321 "E-UTRA MAC Protocol Specification".

On the other hand, the UE autonomous resource allocation is a method in which a base station provides a sidelink transmission/reception resource pool for V2X to the terminal as system information, and the terminal selects a resource pool according to a predetermined rule. The resource selection method may include zone mapping, sensing-based resource selection, and random selection, regardless of service or service type.

The structure of the resource pool for V2X may be configured in a manner in which resources 1e-40, 1e-50, 1e-60 for scheduling allocation (SA) and resources 1e-45, 1e-55, 1e-65 for data transmission are adjacent to each other to form one subchannel, or resources 1e-70, 1e-75, 1e-80 for SA and resources 1e-85, 1e-90, 1e-95 for data transmission are not adjacent. Regardless of which of the above two structures is used, the resource for the SA is composed of two consecutive PRBs and includes information indicating the location of the resource for transmitting data. The number of terminals receiving the V2X service in one cell may be multiple, and the relationship between the base station 1e-01 and the terminals 1e-05, 1e-10, and 1e-15 described above can be extended and applied.

FIG. 1F is a view illustrating a procedure for monitoring and transmitting data of a V2X terminal operating in mode 3 when a service-specific resource pool and a service-agnostic resource pool coexist in a next-generation mobile communication system.

Referring to FIG. 1F, an application server (hereinafter, V2X application server) 1f-05 provides parameter information of V2X communication to terminals 1f-01, 1f-02 (1f-10). Alternatively, the control function (hereinafter, V2X control function) (1f-04) may receive parameter information from the V2X application server 1f-05 and provide parameter information for V2X communication to the terminals 1f-01, 1f-02 (1f-10).

The provisioned parameter may include mapping information of V2X services and destination layer-2 ID(s). For example, since the next-generation mobile communication system should support new V2X services such as platooning, advanced driving, extended sensors, etc. must be supported, new V2X services may be mapped to a destination layer-2 ID(s) through an identifier such as a provider service identifier (PSID), intelligent transport system-application identifiers (ITS-AIDs), or new identifiers of a V2X application.

In addition, the provisioned parameters may include mapping information of V2X frequencies (hereinafter, V2X frequencies) and V2X services, or V2X frequencies and V2X service types (e.g., PSIDs or ITS-AIDs or new identifiers specified above), or V2X frequencies and radio access technology (RAT). Here, the V2X frequencies may represent the V2X LTE frequency or the V2X NR frequency or both, and thus the radio access technology may also represent E-UTRA or NR or both.

In addition, the mapping information specified above may additionally include information on a geographic area(s). For example, in a specific geographic area, the V2X frequencies may not be available due to local regulations, and in a geographic area where privacy is sensitive, the list of available V2X services or the V2X service types may be different, so information on the geographic area may be included in the provisioned parameter together.

In addition, the provisioned parameter may include mapping information of a V2X service and a communication range or a transmission range.

In addition, the provisioned parameters may include mapping information on prose per-packet priority (PPPP) and packet delay budget, or mapping information of V2X service and PPPP, or mapping information of V2X service and prose per-packet reliability (PPPR) for V2X communication.

The provisioned parameter may include all of the information described above or at least one of the information described above.

The terminals 1f-01 and 1f-02 pre-configure parameters initially provided from the V2X application server 1f-05 or the V2X control function 1f-04.

If the terminal 1f-01 having previously configured parameters above is interested in a specific V2X service x, the terminal searches for a suitable cell to camp-on by performing a selection or a selection procedure. In addition, the terminal 1f-01 camps on the cell (1f-15). In this case, the terminal may find a cell to camp-on at a V2X frequency supported by a home public land mobile network (HPLMN)

mapped with a specific V2X service x. The terminal 1f-01 camping on the cell can receive (1f-20) SIB21 from the base station 1f-03.

The system information (1f-20) may include at least one of information on the service-specific resource pools at a serving frequency for signal transmission and reception and information on the service-agnostic resource pools, information on service-specific resource pools of inter-frequency and information on service-agnostic resource pools, information on service-specific resource pools of inter-RAT and information on service-agnostic resource pools, information for configuring synchronization, zone configuration information for the terminal to autonomously select a resource and transmit data, and priority configuration information of a sidelink (PC5) and an LTE/NR uplink and downlink (Uu).

The information on the service-specific resource pool may specifically include information about radio access technology (E-UTRA or NR) that can be supported in the resource pool for each service, information on the mapped services (e.g., a list of V2X services mapped with a combination of a communication region, a transport region, PPPP, PPPR, and Destination Layer-2 ID(s)), resource pool configuration information (e.g., time-domain resource in bitmap format, frequency-domain resource, subcarrier spacing information or cyclic prefix length when NR is supported), transmission power configuration information including a maximum allowed transmission power, and configuration information for a sensing operation.

The information on the service-agnostic resource pool does not include information on mapped services, and may include information on the radio access technology specified above, resource pool configuration information, transmission power configuration information, and configuration information for sensing operation.

The terminal 1f-01 receiving the system information may determine the frequencies/RATs monitored for V2X communication (1f-25). In this case, the terminal may determine the frequencies/RATs to be monitored based on a set of two categories.

The first set (1st set of the monitoring frequencies/RATs, or first resource set) may include an intersection of frequencies specified to support V2X in system information or RRC message (e.g., RRC Connection Reconfiguration message) and frequencies mapped with V2X services considered by the terminal.

The second set (2nd set of the monitoring frequencies/RATs, or second resource set) may include intra-RAT frequencies/inter-RAT frequencies providing a service-specific resource pool to support a specific V2X service x.

The terminal first monitors the second set of resource pools for each service. If there is no frequencies supporting a specific V2X service x in the resource pool for each service, the terminal monitors the resource pool irrelevant to the service included in the first set.

When data traffic for a specific V2X service x is generated (1f-30), the terminal performs an RRC connection with the base station (1f-35). In the above RRC connection process, the terminal may transmit an RRC message by adding information on a specific V2X service x to the base station. The RRC connection process may be performed before data traffic for a specific V2X service x is generated (1f-30).

When there is a service-specific resource pool that supports a specific V2X service x in the serving frequency, the terminal 1 1f-01 requests the base station 1f-03 for transmission resources for V2X communication with other terminals 1f-02 or base station 1f-03 using the service-specific resource pool (1f-40). In this case, the terminal may request transmission resources using an RRC message or a MAC control element (CE).

Here, as the RRC message, SidelinkUEInformation or UEAssistanceInformation message may be used. Meanwhile, the MAC CE may be, as an example, a buffer status report MAC CE of a new format (including at least an indicator indicating that a buffer status report for V2X communication and information on the size of data buffered for D2D communication).

The base station 1f-03 may allocate the V2X transmission resource to the terminal 1 (1f-01) (1f-45). The base station 1f-03 may allocate V2X transmission resources through a dedicated RRC message, and the message may be included in the RRCConnectionReconfiguration message.

The resource allocation may be a V2X resource scheduled from the base station through the Uu interface according to the type of traffic requested by the terminal, congestion of the link, or V2X service, or may be a resource directly selected by the terminal from the resource pool provided from the base station (resource for PC5). In order to determine the resource allocation, the terminal may add and transmit PPPP or PPPR or LCID information of V2X traffic through UEAssistanceInformation or MAC CE. Since the base station also knows information on the resources used by other terminals, the base station schedules a resource requested by the terminal 1 among remaining resources.

In addition, when the RRC message (RRCconnection reconfiguration message) includes SPS configuration information through Uu, the base station may activate the SPS by transmitting DCI through the PDCCH (1f-50).

The terminal 1 1f-01 may select a transmission link and resource according to the resource and transmission method allocated from the base station 1f-03 (1f-55), and transmit data to the terminals 1f-02 or to the base station 1f-03 (1f-60).

If there is no service-specific resource pool that supports a specific V2X service x in the serving frequency, but there is a service-specific resource pool that supports a specific V2X service x in the non-serving frequency, the terminal 1 1f-01 requests a transmission resource capable of V2X communication with other terminals 1f-02 or base station 1f-03 from the base station 1f-03 (1f-40). In this case, the terminal may request a transmission resource using an RRC message or MAC CE.

Here, the RRC message may be a SidelinkUEInformation or UEAssistanceInformation message. Meanwhile, the MAC CE may be, as an example, a buffer status report MAC CE of a new format (including at least an indicator indicating that a buffer status report for V2X communication and information on the size of data buffered for D2D communication).

The base station 1f-03 may allocate a V2X transmission resource to the terminal 1 1f-01 (1f-45). The base station 1f-03 may allocate V2X transmission resources through a dedicated RRC message, and the message may be included in the RRCConnectionReconfiguration message.

The resource allocation may be a V2X resource scheduled from the base station through the Uu interface according to the type of traffic requested by the terminal, congestion of the link, or V2X service, or may be a resource directly selected by the terminal from the resource pool provided from the base station (resource for PC5). In order to determine the resource allocation, the terminal may add and transmit PPPP or PPPR or LCID information of V2X traffic through UEAssistanceInformation or MAC CE. Since the base station also knows information on the resources used by other terminals, the base station may schedule a resource requested by the terminal 1 among remaining resources.

In addition, when the RRC message (RRCconnection reconfiguration message) includes SPS configuration information through Uu, the base station may activate the SPS by transmitting DCI through the PDCCH (1f-50). Terminal 1 1f-01 may select a transmission link and resource according to the resource and transmission method allocated from the base station 1f-03 (1f-55), and transmit data to the terminals 1f-02 or to the base station 1f-03 (1f-60).

FIG. 1G is a view illustrating a data transmission procedure of a V2X terminal operating in mode 4 when a service-specific resource pool and a service-agnostic resource pool coexist in a next-generation mobile communication system.

Referring to FIG. 1G, a V2X application server 1g-05 may provide parameter information for V2X communication to the terminals 1g-01 and 1g-02 (parameter provisioning) (1g-10). Alternatively, the V2X control function (1g-04) may receive parameter information from the V2X Application Server 1g-05 and provide parameter information for V2X communication to the terminals 1g-01, 1g-02 (1g-10).

The provisioned parameter may include mapping information of V2X services and destination layer-2 ID(s). For example, in a next-generation mobile communication system, new V2X services such as platooning, advanced driving, extended sensors, etc. should be supported. Therefore, the new V2X service may be mapped to the destination layer-2 ID(s) through an identifier such as PSID or ITS-AIDs or new identifiers of the V2X application.

In addition, the provisioned parameters may include mapping information of V2X frequencies and V2X services or V2X frequencies and V2X service types (e.g., PSID or ITS-AIDs or new identifiers specified above) or V2X frequencies and radio access technology (RAT). Here, the V2X frequencies may represent the V2X LTE frequency or the V2X NR frequency or both, and thus the radio access technology may also represent E-UTRA or NR or both.

In addition, the mapping information specified above may additionally include information on a geographic area(s). For example, in a specific geographic area, the usage of the V2X frequencies may not be possible due to local regulations, and in a geographic area where privacy is sensitive, the list of available V2X services or the V2X service type may be different, thus, information on the geographic area may be included in the provisioned parameters together.

In addition, the provisioned parameter may include mapping information of a V2X service and a communication range or a transmission range.

In addition, the provisioned parameters may include mapping information of PPPP and packet delay budget, mapping information of V2X service and PPPP, or mapping information of V2X service and PPPR for V2X communication.

The provisioned parameter may include all of the information described above or at least one of the information described above.

The terminals 1g-01 and 1g-02 may pre-configure parameters initially provided from the V2X application server 1g-05 or the V2X control function 1f-04.

There is a difference in that, unlike mode 3, in which the base station 1g-03 is directly involved in resource allocation, in mode 4 operation, the terminal 1 1g-01 may autonomously select resources and transmit data, based on the resource pool previously received through system information.

The disclosure proposes that the base station 1g-03 in V2X communication allocates a sidelink service-specific resource pool and a sidelink service-agnostic resource pool for terminal 1 1g-01. A terminal interested in a specific V2X service x may autonomously select an available resource pool after sensing resources used by other neighboring terminals from the sidelink resource pool for each service. Alternatively, the terminal may randomly select a resource from a preconfigured resource pool.

In addition, a terminal that intends to transmit/receive information irrelevant to a service type may autonomously select an available resource pool after sensing resources used by other neighboring terminals from the sidelink service-agnostic resource pool. Alternatively, the terminal may randomly select a resource from a preconfigured resource pool.

The terminal 1 1g-01 having preconfigured parameters above may perform a selection or selection procedure when interested in a specific V2X service x to find a suitable cell for camp-on. Then, the terminal 1g-01 camps on the cell (1g-15). Here, the terminal may find a cell to camp-on to a V2X frequency supported by the HPLMN mapped to a specific V2X service x. The terminal 1 1g-01 camping on may receive (1g-20) SIB21 from the base station 1g-03.

The system information (1g-20) may include at least one of information on a service-specific resource pool in a serving frequency for signal transmission and reception, information on a service-agnostic resource pool, information on service-specific resource pool and information on service-agnostic resource pool of inter-frequency, information on a service-agnostic resource pool, information on a service-specific resource pool and information on a service-agnostic resource pool of inter-RAT, information for configuring synchronization, zone configuration information for the terminal to autonomously select resources and transmit data, priority configuration information of the sidelink (PC5) and LTE/NR uplink and downlink (Uu)

The information on service-specific resource pool may specifically include information about radio access technology (E-UTRA or NR) that can be supported in the resource pool for each service, information on the mapped services (e.g., a list of V2X services mapped with a combination of a communication region, a transport region, PPPP, PPPR, and Destination Layer-2 ID(s)), resource pool configuration information (e.g., time-domain resource in bitmap format, frequency-domain resource, subcarrier spacing information or cyclic prefix length when NR is supported), transmission power configuration information including a maximum allowed transmission power, and configuration information for a sensing operation.

The information on service-agnostic resource pool does not include information on mapped services, and may include information on the radio access technology specified above, resource pool configuration information, transmission power configuration information, and configuration information for sensing operation.

The terminal 1 1g-01 receiving the system information may determine the frequencies/RATs monitored for V2X communication (1g-25). In this case, the terminal 1 1g-01 may determine the monitored frequencies/RATs, based on a set of two categories.

The first set (1st set of the monitoring frequencies/RATs, or first resource set) may include an intersection of frequencies specified to support V2X in system information or RRC message (e.g., RRC Connection Reconfiguration message) and frequencies mapped with V2X services considered by the terminal.

The second set (2nd set of the monitoring frequencies/RATs, or second resource set) may include intra-RAT frequencies/inter-RAT frequencies providing a service-specific resource pool to support a specific V2X service x.

The terminal first monitors the second set of resource pools for each service. If there is no frequencies supporting a specific V2X service x in the resource pool for each service, the terminal monitors the resource pool irrelevant to the service included in the first set. If the terminal 1 1g-01 does not receive the system information or the RRC message, the terminal may perform the above operation, based on preconfigured information from the V2X control function 1g-04 or V2V application server 1g-05.

When data traffic for a specific V2X service x is generated (1g-30), the terminal 1 1g-01 may select a resource in the time/frequency domain (1g-35) and transmit data to at least one other terminal 1g-02 according to the configuration information (e.g., transmission operation (one dynamic allocation transmission, dynamic allocation multiple transmission, one sensing-based transmission, sensing-based multiple transmission, random transmission) configured for a service-specific resource pool for a specific V2X service x) received from the base station 1g-03 through system information (1g-40).

In a mode 4 operation, for sensing-based multi-transmission, the terminal may sense resources for transmitting signals from other terminals, select a transmittable resource block from the resource pool in which the corresponding transmission is performed, and then reserve resources to be periodically transmitted. Thereafter, if the data packet generated by the terminal is changed or disappears, the terminal restarts or cancels the above sensing and resource reservation operation so that a new data packet can be delivered.

As described above, sensing and resource reservation-based multi-transmission may be basically operated, and if the sensing operation is not well performed, communication may be performed through random resource selection from a corresponding resource pool. If the terminal does not receive system information or RRC message, the above operation is performed based on preconfigured information from a V2X control function 1g-04 or a V2V application server 1g-05.

Figure 1H:
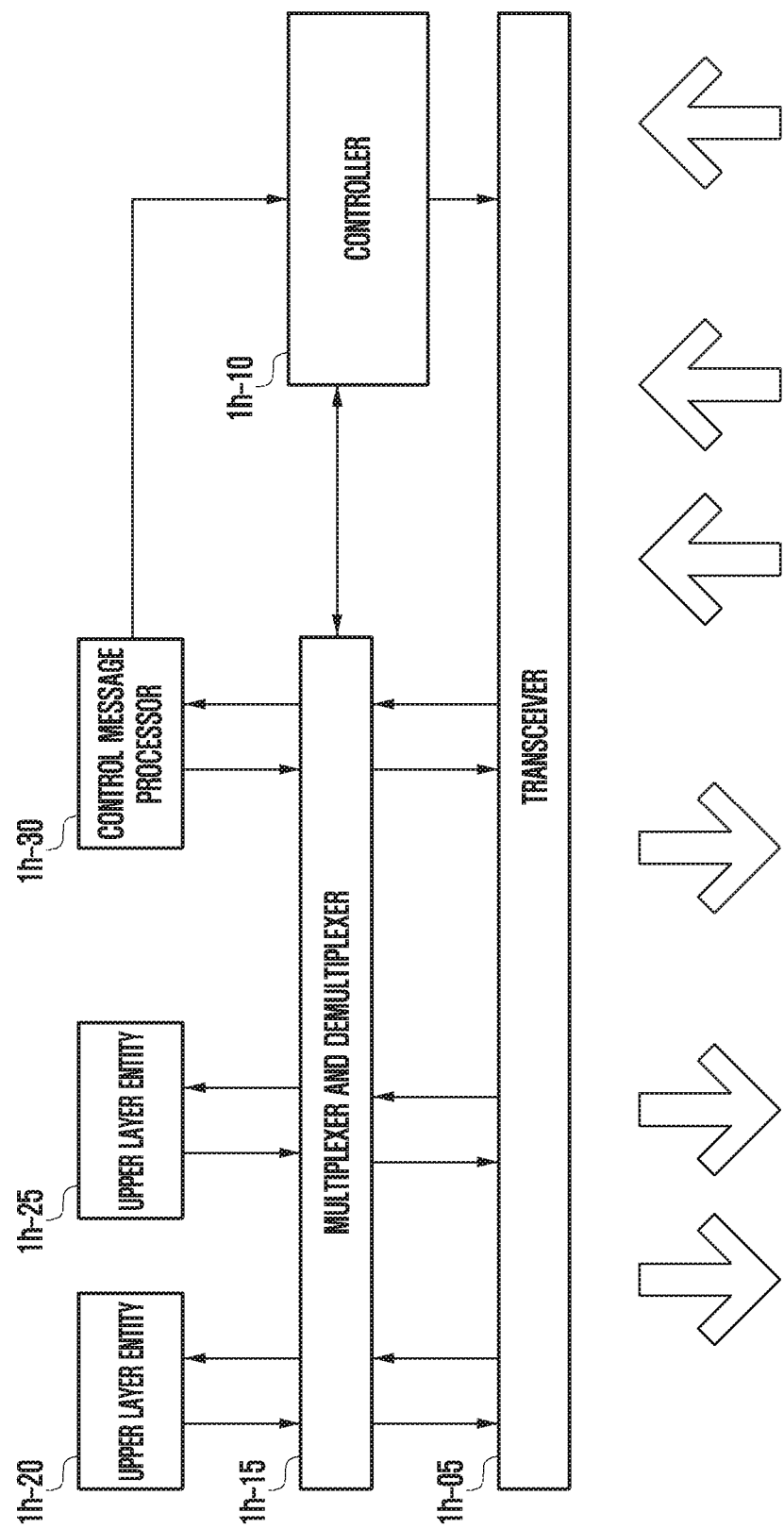
FIG. 1H is a view illustrating a block configuration of a terminal according to the disclosure.
Figure 11:
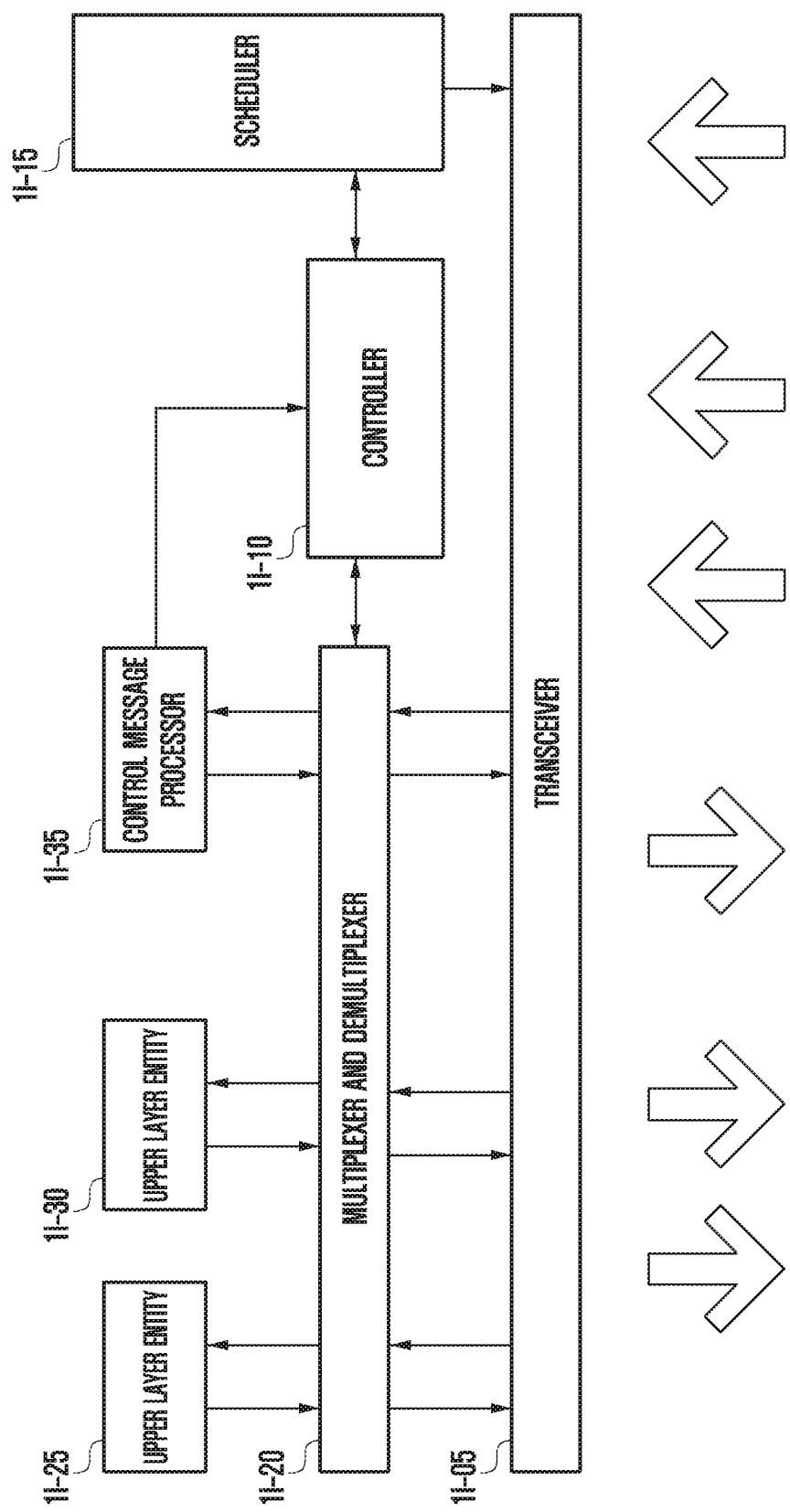

FIG. 1H is a view illustrating a block configuration of a terminal according to the disclosure.

As illustrated in FIG. 1H, the terminal according to an embodiment of the disclosure includes a transceiver 1h-05, a controller 1h-10, a multiplexer and demultiplexer 1h-15, upper layer processor 1h-20 and 1h-25, and control message processor 1h-30.

The transceiver 1h-05 receives data and a predetermined control signal through a forward channel of a serving cell, and transmits data and a predetermined control signal through a reverse channel. When a plurality of serving cells are configured, the transceiver 1h-05 performs data transmission/reception and control signal transmission/reception through the plurality of serving cells. The multiplexer and demultiplexer 1h-15 multiplexes data generated by the upper layer processors 1h-20 and 1h-25 or the control message processor 1h-30 or transmits data received from the transceiver 1h-05 to transmit the same to the appropriate upper layer processor 1h-20 and 1h-25 or the control message processor 1h-30. The control message processor 1h-30 transmits and receives a control message from the base station and takes necessary actions. The action includes a function of processing control messages such as RRC messages and MAC CE, reporting of CBR measurement values, and reception of RRC messages for resource pool and terminal operation. The upper layer processors 1h-20 and 1h-25 refer to DRB devices and may be configured for each service. The upper layer processors 1h-20 and 1h-25 process data generated from user services such as file transfer protocol (FTP) or voice over Internet protocol (VoIP) and deliver them to the multiplexing and demultiplexing units (1h-15), or process the data transmitted from the multiplexer and demultiplexer 1h-15 and transmit the processed data to the upper layer service application. The controller 1h-10 identifies the scheduling command received through the transceiver 1h-05, for example, reverse grants, and controls the transceiver 1h-05 and the multiplexer and demultiplexer 1h-15 so that reverse transmission is performed with the appropriate transmission resource at the appropriate time. Meanwhile, in the above, it has been described that the terminal is composed of a plurality of blocks and each block performs a different function, but this is only an exemplary embodiment and is not limited thereto. For example, the controller 1h-10 itself may perform a function performed by the demultiplexer 1h-15.

FIG. 1I is a block diagram showing the configuration of a base station according to the disclosure.

The base station apparatus of FIG. 1i includes a transceiver 1i-05, a controller 1i-10, a multiplexer and demultiplexer 1i-20, a control message processor 1i-35, upper layer processors 1i-25 and 1i-30, and a scheduler 1i-15.

The transceiver 1i-05 transmits data and a predetermined control signal through a forward carrier and receives data and a predetermined control signal through a reverse carrier. When multiple carriers are configured, the transceiver 1i-05 performs data transmission/reception and control signal transmission/reception through the multiple carriers. The multiplexer and demultiplexer 1i-20 multiplexes data generated by the upper layer processors 1i-25 and 1i-30 or the control message processor 1i-35 or demultiplexes the data received from the transceiver 1i-05 to transmit the same to the appropriate upper layer processors 1i-25 and 1i-30, the control message processor 1i-35, or the controller 1i-10. The control message processor 1i-35 receives an instruction from the controller, generates a message to be transmitted to the terminal, and transmits the generated message to a lower layer. The upper layer processors 1i-25 and 1i-30 may be configured for each terminal-specific service, process data generated from user services such as FTP or VoIP and transmit the data to the multiplexing and demultiplexing unit 1i-20, or process the data transmitted from the multiplexer and demultiplexer 1i-20 and transmit the data to the upper layer service application. The scheduler 1i-15 allocates transmission resources to the terminal at an appropriate time in consideration of the buffer status of the terminal, channel status, and active time of the terminal, and processes the signal transmitted by the terminal to the transceiver or transmits the signal to the terminal.

In the specific embodiments of the disclosure described above, the constituent elements included in the disclosure are expressed in the singular or plural according to the presented specific embodiment. However, the singular or plural expression is selected appropriately for the situation presented for convenience of description, and the disclosure is not limited to the singular or plural constituent elements, and even constituent elements expressed in plural are composed of the singular or singular. Even a component expressed in plural may be composed of a singular number, or even a component expressed in a singular number may be composed of plural.

Meanwhile, although specific embodiments have been described in the detailed description of the disclosure, various modifications may be made without departing from the scope of the disclosure. Therefore, the scope of the disclosure should not be limited to the described embodiments and should not be defined by the scope of the claims to be described later, as well as the scope and equivalents of the claims.

In addition, the disclosure can be summarized as follows.
1. Definition of service-specific resource pool to support diverse R16 V2X services both for the serving cell and for the inter-frequency.
2. Co-existence of service-specific resource pool and service-agnostic resource pool.
3. Classification of V2X services, based on PPPP, range, PPPR, Prose L2 ID or a combination of the above information.

In addition, the disclosure can be summarized as follows.
1. UE←V2X server: Parameter provisioning
   The mapping information of Destination Layer-2 ID(s) and the V2X services, e.g. PSID, ITS-AIDs, ES, platooning . . . .
   The mapping information of services to V2X frequencies/RATs (LTE or NR or both)
   The mapping information of services to range (high, medium, low)
   The mapping information of services to PPPP
   The mapping information of services to PPPR
2. UE interested in V2X service x: Camping on a V2X frequency of HPLMN mapped to service x
3. UE: Receiving V2X system information, the V2X system information may include at least one of the following information.
   Serving frequency
     Service-specific resource pools
     Service-agnostic resource pools
   Inter-frequency
     Service-specific resource pools
     Service-agnostic resource pools
   Inter-RAT
     Service-specific resource pools
     Service-agnostic resource pools
   Service-specific resource pools
     RAT information (optional; present only if it is included in Inter-RAT branch)
       E-UTRA or NR
     Mapped services
       List of mapped services
     Range, PPPP, Destination L2 ID or combination of them
     Resource Pool configuration
       Time domain resource: bitmap
       Frequency domain resource . . . .
       SCS (If it is NR) and CP length)
     Transmission power configuration
       Maximum allowed transmission power
     Resource sensing parameters
   Service-agnostic resource pool
     RAT information
     Resource pool configuration
     Transmission power configuration
     Resource sensing parameters
4. Determining the frequencies/RATs for monitoring
   1st set of the monitoring frequencies/RATs:
     Intersection of frequencies mapped with the concerned V2X service and the frequencies indicated supporting V2X in the system information
   2nd set of the monitoring frequencies/RATs:
     Intra-RAT frequencies/inter-RAT frequencies providing service specific pool for Service x
   UE monitors the service specific pools of the 2nd set
   If none of the frequencies provide the service specific pool for service x
   UE monitors service agnostic pools of 1st set
5. Determining the frequencies/RATs for transmission
   UE transmits the data for service X in the service specific resource pool of X in the serving frequency (if supported) or in the non-serving frequency (if not supported by serving frequency)

Second Embodiment

Hereinafter, the operating principle of the disclosure will be described in detail with reference to the accompanying drawings. In the following description of the disclosure, when it is determined that a detailed description of a related known function or configuration may unnecessarily obscure the subject matter of the disclosure, the detailed description thereof will be omitted. In addition, terms to be described later are terms defined in consideration of functions in the disclosure, which may vary according to the intention or custom of users and operators. Therefore, the definition should be made based on the contents throughout this specification. Terms for identifying an access node used in the following description, terms for network entities, terms for messages, terms for interfaces between network objects, terms referring to various identification information, and the like are exemplified for convenience of description. Therefore, the disclosure is not limited to the terms described below, and other terms referring to objects having an equivalent technical meaning may be used.

For convenience of description below, the disclosure uses terms and names defined in the 3rd generation partnership project long term evolution (3GPP LTE) standard. However, the disclosure is not limited by the terms and names, and can be applied equally to systems conforming to other standards.

Figure 2A:
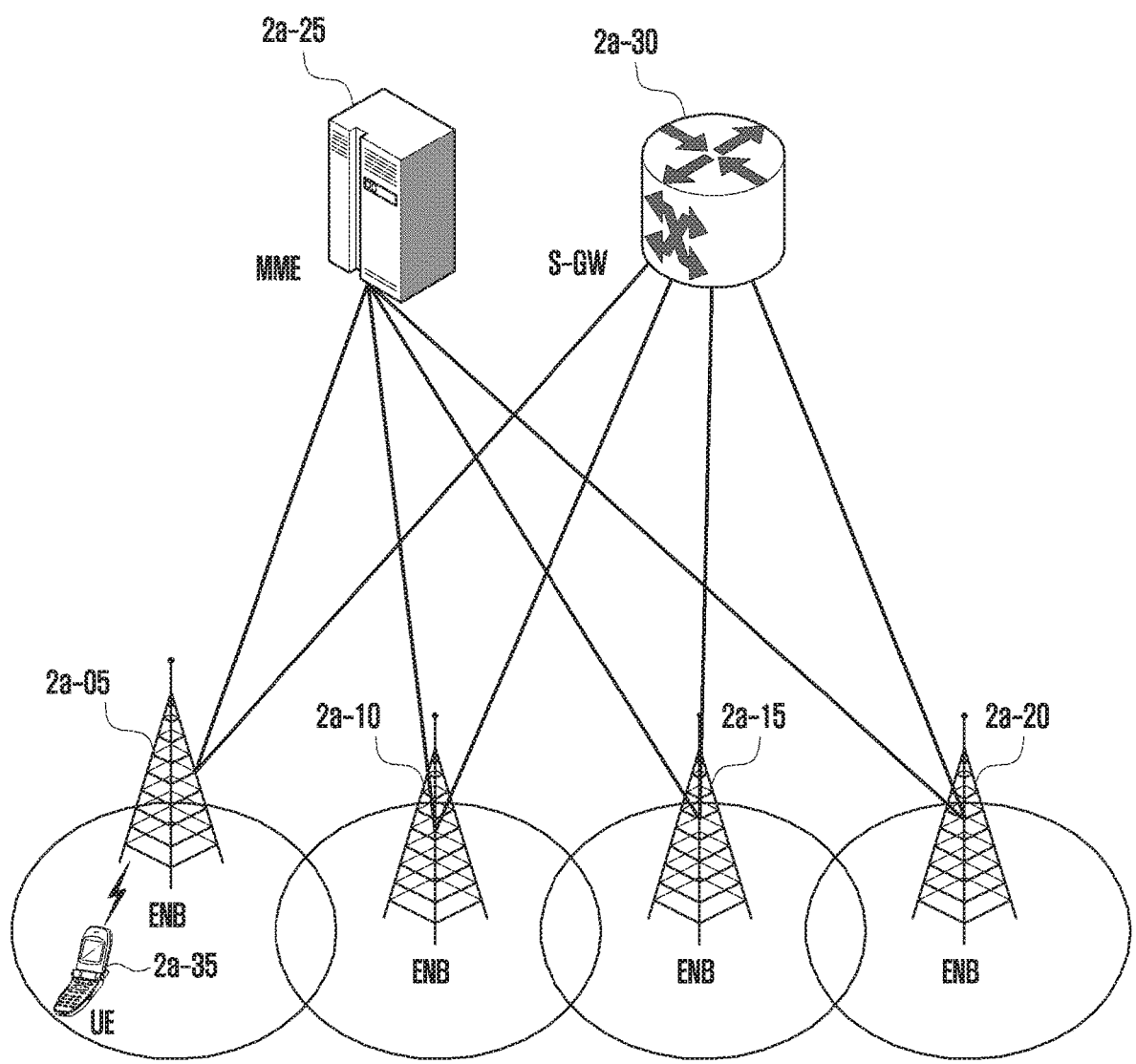
FIG. 2A is a view illustrating the structure of the LTE system of the disclosure.

FIG. 2A is a view illustrating a structure of an LTE system referred to for description of the disclosure.

Referring to FIG. 2A, as illustrated, the radio access network of the LTE system is composed of next-generation base stations (evolved node B, hereinafter eNB, Node B or base station) 2a-05, 2a-10, 2a-15, 2a-20, an MME 2a-25, and an S-GW 2a-30. A user equipment (hereinafter, UE or terminal) 2a-35 access an external network through the eNB 2a-05~2a-20 and the S-GW 2a-30.

In FIG. 2A, the eNB 2a-05~2a-20 correspond to the existing Node B of the UMTS system. The eNB is connected to the UEs 2a-35 through a radio channel and performs a more complex role than the existing Node B. Since, in the LTE system, all user traffic, including real-time services such as VoIP through Internet protocol, are serviced through a shared channel, a device for scheduling by collecting state information such as buffer status, available transmission power status, and channel status of UEs is required, and the eNBs 2a-05 to 2a-20 are in charge. One eNB typically controls multiple cells. For example, in order to implement a transmission rate of 100 Mbps, the LTE system uses, for example, an orthogonal frequency division multiplexing scheme (OFDM) in a 20 MHz bandwidth as a radio access technology. In addition, an adaptive modulation coding (AMC) method is applied to determine a modulation scheme and a channel coding rate according to a channel state of the terminal.

The S-GW 2a-30 is a device that provides a data bearer, and generates or removes a data bearer under the control of the MME 2a-25. The MME is a device responsible for various control functions as well as mobility management functions for a terminal, and is connected to a plurality of base stations.

Figure 2B:
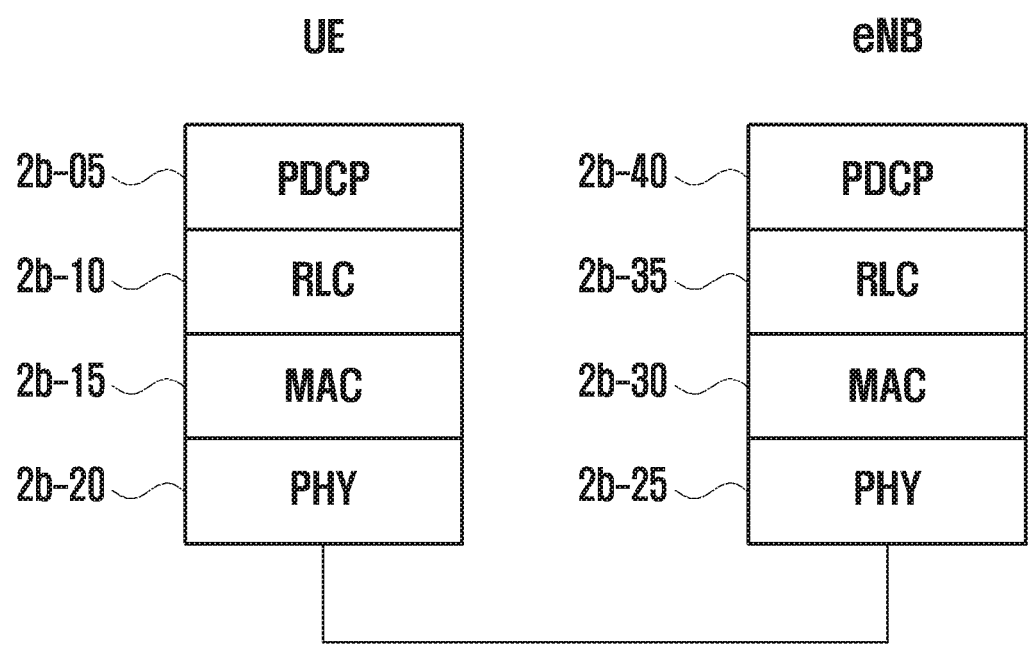
FIG. 2B is a view illustrating a radio protocol structure in the LTE system of the disclosure.

FIG. 2B is a view illustrating a radio protocol structure in the LTE system of the disclosure.

Referring to FIG. 2B, the radio protocol structure in the LTE system includes PDCPs 2b-05 and 2b-40, RLCs 2b-10 and 2b-35, and MACs 2b-15 and 2b-30 in a terminal and eNB, respectively. The PDCPs 2b-05 and 2b-40 are in charge of operations such as IP header compression/restore. The main functions of the PDCP are summarized as follows.
  Header compression and decompression: ROHC only
  Transfer of user data
  In-sequence delivery of upper layer PDUs at PDCP re-establishment procedure for RLC AM
  For split bearers in DC (only support for RLC AM): PDCP PDU routing for transmission and PDCP PDU reordering for reception
  Duplicate detection of lower layer SDUs at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink The radio link controls (RLCs) 2b-10 and 2b-35 reconstruct the PDCP PDU to an appropriate size and performs an ARQ operation. The main functions of RLCs are summarized as follows.
  Transfer of upper layer PDUs
  Error Correction through ARQ (only for AM data transfer)
  Concatenation, segmentation and reassembly of RLC SDUs (only for UM and AM data transfer)
  Re-segmentation of RLC data PDUs (only for AM data transfer)
  Reordering of RLC data PDUs (only for UM and AM data transfer
  Duplicate detection (only for UM and AM data transfer)
  Protocol error detection (only for AM data transfer)
  RLC SDU discard (only for UM and AM data transfer)
  RLC re-establishment The MACs 2b-15 and 2b-30 are connected to several RLC layer entities configured in one UE, and perform an operation of multiplexing RLC PDUs to MAC PDUs and demultiplexing RLC PDUs from MAC PDUs. The main functions of MAC are summarized as follows.
  Mapping between logical channels and transport channels
  Multiplexing/demultiplexing of MAC SDUs belonging to one or different logical channels into/from transport blocks (TB) delivered to/from the physical layer on transport channels
  Scheduling information reporting
  Error correction through HARQ
  Priority handling between logical channels of one UE
  Priority handling between UEs by means of dynamic scheduling
  MBMS service identification
  Transport format selection
  Padding The physical layers 2b-20 and 2b-25 channel-code and modulate upper layer data, convert the same into OFDM symbols, and transmit the same to the radio channel, or demodulate OFDM symbols received through the radio channel, channel-decode the same, and transmit the same to the upper layer. In addition, the physical layer also uses hybrid ARQ (HARQ) for additional error correction, and the receiving end transmits the reception of the packet transmitted by the transmitting end in 1 bit. This is called HARQ ACK/NACK information. Downlink HARQ ACK/NACK information for uplink transmission may be transmitted through a physical hybrid-ARQ indicator channel (PHICH), and uplink HARQ ACK/NACK information for downlink transmission may be transmitted through a physical uplink control channel (PUCCH) or a physical uplink shared channel (PUSCH).

Meanwhile, the PHY layer may consist of one or a plurality of frequencies/carriers, and a technology for simultaneously configuring and using a plurality of frequencies is referred to as a carrier aggregation (hereinafter referred to as "CA") technology. Through CA technology, only one carrier has been used for communication between the terminal and the base station (E-UTRAN NodeB, eNB), but the amount of transmission can be dramatically increased by the number of subcarriers by additionally using a main carrier and one or a plurality of subcarriers. Meanwhile, in LTE, a cell in a base station using a primary carrier is called a primary cell (PCell), and a subcarrier is called a secondary cell (SCell).

Although not shown in this figure, there is a radio resource control (hereinafter referred to as "RRC") layer, respectively, above the PDCP layer of the terminal and the base station, and the RRC layer may transmit and receive access and measurement-related configuration control messages for radio resource control.

Figure 2C:
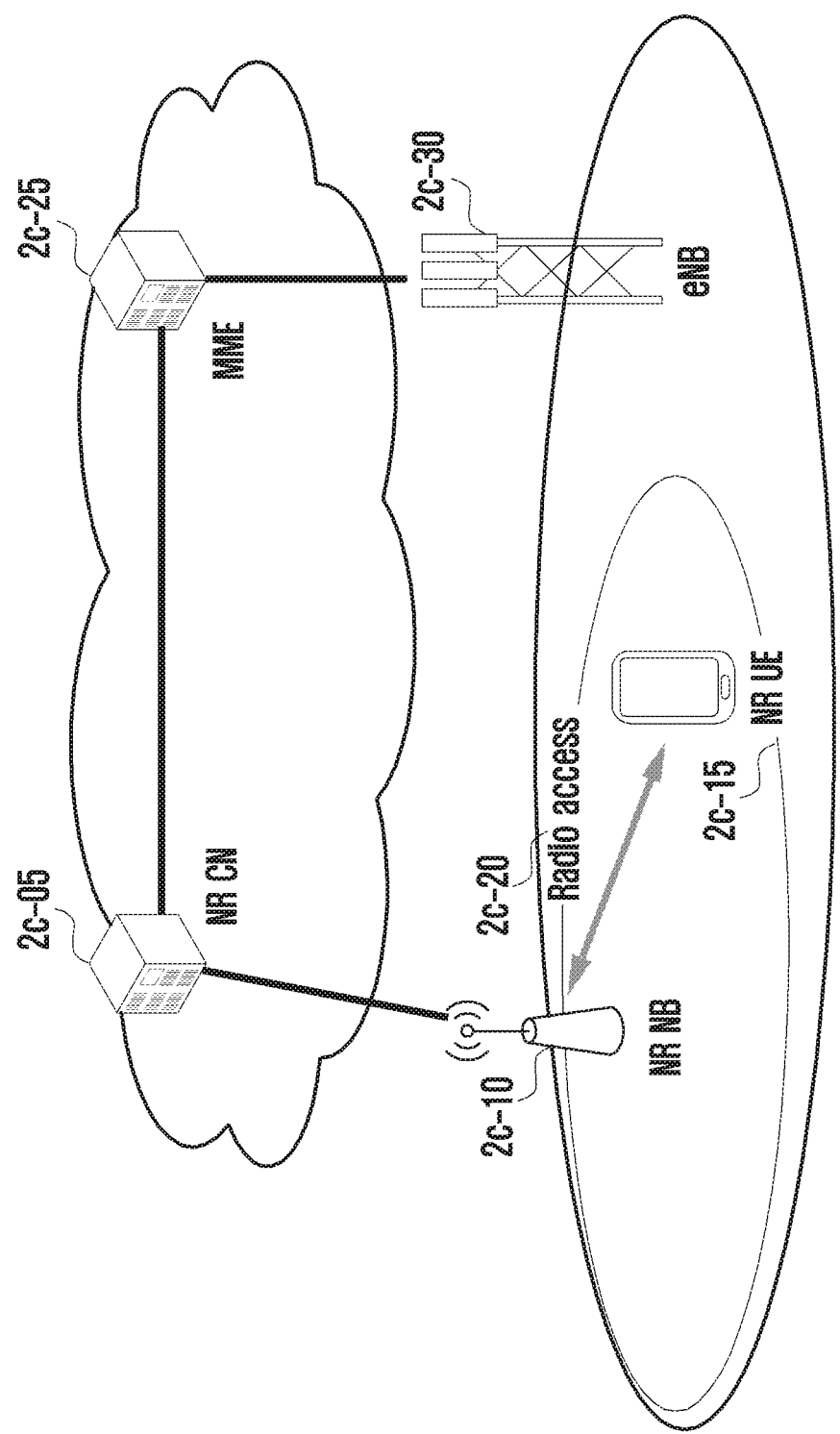
FIG. 2C is a view illustrating the structure of a next-generation mobile communication system to which the disclosure is applied.

FIG. 2C is a view illustrating the structure of a next-generation mobile communication system to which the disclosure is applied.

Referring to FIG. 2C, as illustrated, the radio access network of a next-generation mobile communication system is composed of next-generation base station (NR NB) 2c-10 and NR CN (or next generation core network (NG CN)) 2c-05. The user terminal (NR UE or terminal) 2c-15 accesses an external network through the NR NB 2c-10 and the NR CN 2c-05.

In FIG. 2c, the NR NB 2c-10 corresponds to the eNB of the existing LTE system. The NR NB is connected to the NR UE 2c-15 through a radio channel and can provide a service superior to that of the existing Node B. In the next-generation mobile communication system, since all user traffic is serviced through a shared channel, a device that collects and schedules status information such as buffer status, available transmission power status, and channel status of UEs is required, and the NR NB 2c-10 is in charge.

One NR NB typically controls multiple cells. In order to implement ultra-high-speed data transmission compared to the existing LTE, it may have more than the existing maximum bandwidth, and additional beamforming technology may be grafted using orthogonal frequency division multiplexing (OFDM) as a wireless access technology. In addition, an adaptive modulation coding (AMC) method is applied to determine a modulation scheme and a channel coding rate according to a channel state of the terminal.

The NR CN 2c-05 performs functions such as mobility support, bearer configuration, and QoS configuration. The NR CN is a device responsible for various control functions as well as a mobility management function for a terminal, and is connected to a plurality of base stations. In addition, the next-generation mobile communication system can be interlocked with the existing LTE system, and the NR CN is connected to the MME 2c-25 through a network interface. The MME is connected to the existing eNB 2c-30.

Figure 2D:
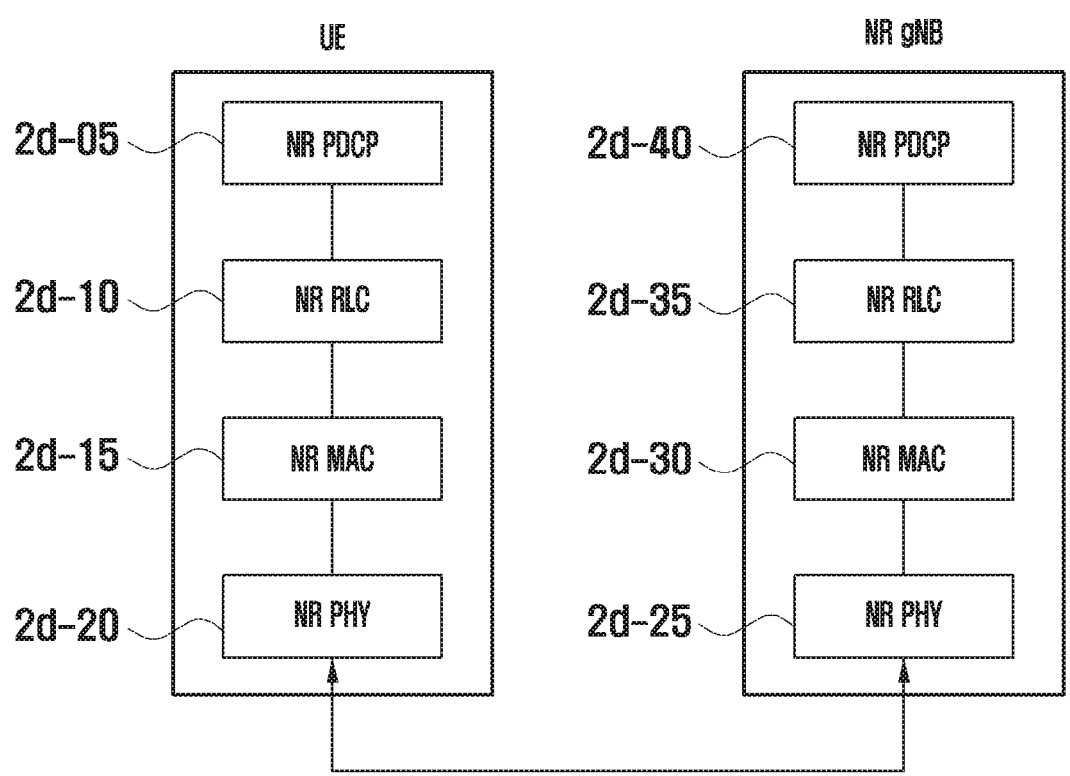
FIG. 2D is a view illustrating a radio protocol structure of a next-generation mobile communication system to which the disclosure is applied.

FIG. 2D is a view illustrating a radio protocol structure of a next-generation mobile communication system to which the disclosure is applied.

Referring to FIG. 2D, the radio protocol structure of a next-generation mobile communication system is composed of NR PDCPs 2d-05 and 2d-40, NR RLCs 2d-10 and 2d-35, and NR MACs 2d-15 and 2d-30 in a terminal and NR base station, respectively. The main functions of the NR PDCPs 2d-05 and 2d-40 may include some of the following functions.

Header compression and decompression: ROHC only
Transfer of user data
In-sequence delivery of upper layer PDUs
PDCP PDU reordering for reception
Duplicate detection of lower layer SDUs
Retransmission of PDCP SDUs
Ciphering and deciphering
Timer-based SDU discard in uplink In the above, the reordering function of the NR PDCP device refers to a function of reordering PDCP PDUs received from a lower layer in order based on a PDCP sequence number (SN), may include the function of passing data to the upper layer in the order of reordering, may include a function of reordering the order to record the lost PDCP PDUs, may include a function of reporting the status of the lost PDCP PDUs to the sender, and may include a function of requesting retransmission of lost PDCP PDUs.

The main functions of the NR RLCs 2d-10 and 2d-35 may include some of the following functions.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
protocol error detection
RLC SDU discard
RLC re-establishment In the above, the in-sequence delivery function of the NR RLC device refers to a function of sequentially delivering RLC SDUs received from a lower layer to an upper layer, may include a function of reassembling and delivering when one RLC SDU is originally divided into multiple RLC SDUs and received, may include a function of rearranging received RLC PDUs, based on an RLC sequence number (SN) or a PDCP sequence number (SN), may include a function of rearranging the order and recording the lost RLC PDUs, may include a function of reporting the status of lost RLC PDUs to the transmitting side, may include a function of requesting retransmission of lost RLC PDUs, may include a function of transferring only RLC SDUs up to before the lost RLC SDU to an upper layer in order when there is a lost RLC SDU, may include a function of sequentially delivering all RLC SDUs received before the timer starts to an upper layer even if there is a lost RLC SDU, if a predetermined timer has expired, and may include a function of sequentially delivering all RLC SDUs received so far to the upper layer even if there is a lost RLC SDU, if a predetermined timer has expired. In addition, RLC PDUs may be processed in the order of reception (regardless of the order of serial number and sequence number, in the order of arrival) and delivered to the PDCP device regardless of the order (out-of-sequence delivery), and in the case of a segment, segments stored in a buffer or to be received in the future may be received, reconstructed into a complete RLC PDU, processed, and delivered to the PDCP device. The NR RLC layer may not include a concatenation function, and the function may be performed in the NR MAC layer or may be replaced by a multiplexing function of the NR MAC layer.

In the above, the out-of-sequence delivery function of the NR RLC device refers to a function of directly delivering RLC SDUs received from a lower layer to an upper layer regardless of order, may include a function of reassembling and delivering when one RLC SDU is originally divided into multiple RLC SDUs and received, and may include a function of storing the RLC SNs or PDCP SNs of received RLC PDUs, sorting the order, and recording the lost RLC PDUs.

The NR MACs 2d-15 and 2d-30 may be connected to several NR RLC layer entities configured in one terminal, and the main functions of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 2d-20 and 2d-25 may channel-code and modulate the upper layer data, make the same into OFDM symbols, and transmits the same over a wireless channel, or may demodulate the OFDM symbol received through a radio channel, decode the channel, and transmit the same to an upper layer.

Although not illustrated in this figure, there is a radio resource control (hereinafter referred to as "RRC") layer, respectively, above the PDCP layer of the terminal and the base station, and the RRC layer transmits and receives access and measurement-related configuration control messages for radio resource control.

FIG. 2E is a view illustrating V2X communication within the cellular system of the disclosure.

V2X collectively refers to communication technology through all interfaces with the vehicle, and may include V2V, V2I, V2P, V2N, and the like according to the form and communication elements. The V2P and V2V basically follow the structure and operation principle of Rel-13 inter-device communication (D2D). That is, it is based on a sidelink (PC5) operation, and actual data packets may be transmitted and received through a sidelink, which is a transmission channel between the terminals, not the uplink and downlink of the base station and the terminal. This basic concept can be applied not only to V2X defined in LTE, but also to V2X that can be newly defined in NR, and upgrades for specific scenarios can be applied.

The base station 2e-01 may communicate with at least one of vehicle terminals 2e-05 and 2e-10 and a pedestrian portable terminal 2e-15 located in the cell 2e-02 supporting V2X. For example, the vehicle terminal 2e-05 can perform cellular communication with the base station 2e-01 using the vehicle terminal-base station link (Uu, 2e-30, 2e-35), and may perform device-to-device communication with another vehicle terminal 2e-10 or a pedestrian's portable terminal 2e-15 using side link PC5s 2e-20 and 2e-25.

In the above, the base station may be an upgraded eNB supporting gNB or NR. In order for the vehicle terminals 2e-05 and 2e-10 and the pedestrian mobile terminal 2e-15 to directly transmit and receive information using the sidelink (2e-20, 2e-25), the base station should allocate a resource pool that can be used for sidelink communication. A method of allocating resources by a base station to a terminal in V2X of the LTE system is described below, and a similar approach as in the LTE may be applied in V2X introduced in the NR system. However, in NR, different numerology is used, and the design of the sidelink resource pool may be somewhat different.

Based on the V2X of the LTE system, it can be divided into two types: scheduled resource allocation (mode 3) and UE autonomous resource allocation (mode 4) according to how the base station allocates resources to the terminal.

The scheduled resource allocation is a method in which the base station allocates resources used for sidelink transmission to RRC-connected terminals in a dedicated scheduling scheme. The method is effective for interference management and resource pool management (dynamic allocation, semi-persistence transmission) because the base station can manage the resources of the sidelink. In addition, in the case of scheduled resource allocation (mode 3) in which the base station allocates and manages resources for V2X, when the RRC connected terminal has data to be transmitted to other terminals, the terminal may transmit a resource allocation request to the base station using an RRC message or a MAC control element (CE). Here, the RRC message may be a SidelinkUEInformation or UEAssistanceInformation message. Meanwhile, as an example of the MAC CE may, a buffer status report MAC CE of a new format (including at least an indicator indicating that a buffer status report for V2X communication and information on the size of data buffered for sidelink communication) may be used. For detailed format and contents of the buffer status report used in 3GPP, refer to 3GPP standard TS36.321 "E-UTRA MAC Protocol Specification".

On the other hand, UE autonomous resource allocation is a method in which the base station provides a sidelink transmission/reception resource pool for V2X to a terminal as system information, and the terminal selects a resource pool according to a predetermined rule. The resource selection method may include zone mapping, sensing-based resource selection, and random selection.

The structure of the resource pool for V2X may be configured in a manner in which resources 2e-40, 2e-50, 2e-60 for scheduling allocation (SA) and resources 2e-45, 2e-55, 2e-65 for data transmission are adjacent to each other to form one subchannel, or may be configured in a manner in which the resources 2e-70, 2e-75, 2e-80 for SA and the resources 2e-85, 2e-90, 2e-95 for data transmission are not adjacent. Regardless of which of the above two structures is used, the resource for the SA consists of two consecutive PRBs and includes information indicating the location of the resource for transmitting data. The number of terminals receiving the V2X service in one cell may be multiple, and the relationship between the base station 2e-01 and the terminals 2e-05, 2e-10, 2e-15 described above may be extended and applied.

In addition, in order to transmit and receive sidelink data through the resource pool, V2X service is basically classified through a destination layer2 ID (or destination ID) in the V2X of the LTE system. That is, the source/destination layer2 ID (each 24 bit size) of the terminal is included in the header of the V2X data packet transmitted through the sidelink, that is, the MAC PDU, the source layer2 ID means the unique identifier of the terminal, and the destination layer2 ID indicates the service type of V2X data traffic delivered by the terminal.

If the other terminal, which has received the destination layer2 ID transmitted by the transmission terminal, subscribes to and is configured to receive the service for the corresponding destination layer2 ID, the data packet belonging to the corresponding MAC PDU is decoded and delivered to the upper layer. The mapping information for the destination layer2 ID and the V2X data packet is transferred from the V2X server to the V2X control function and provisioned to the terminal.

Figure 2F:
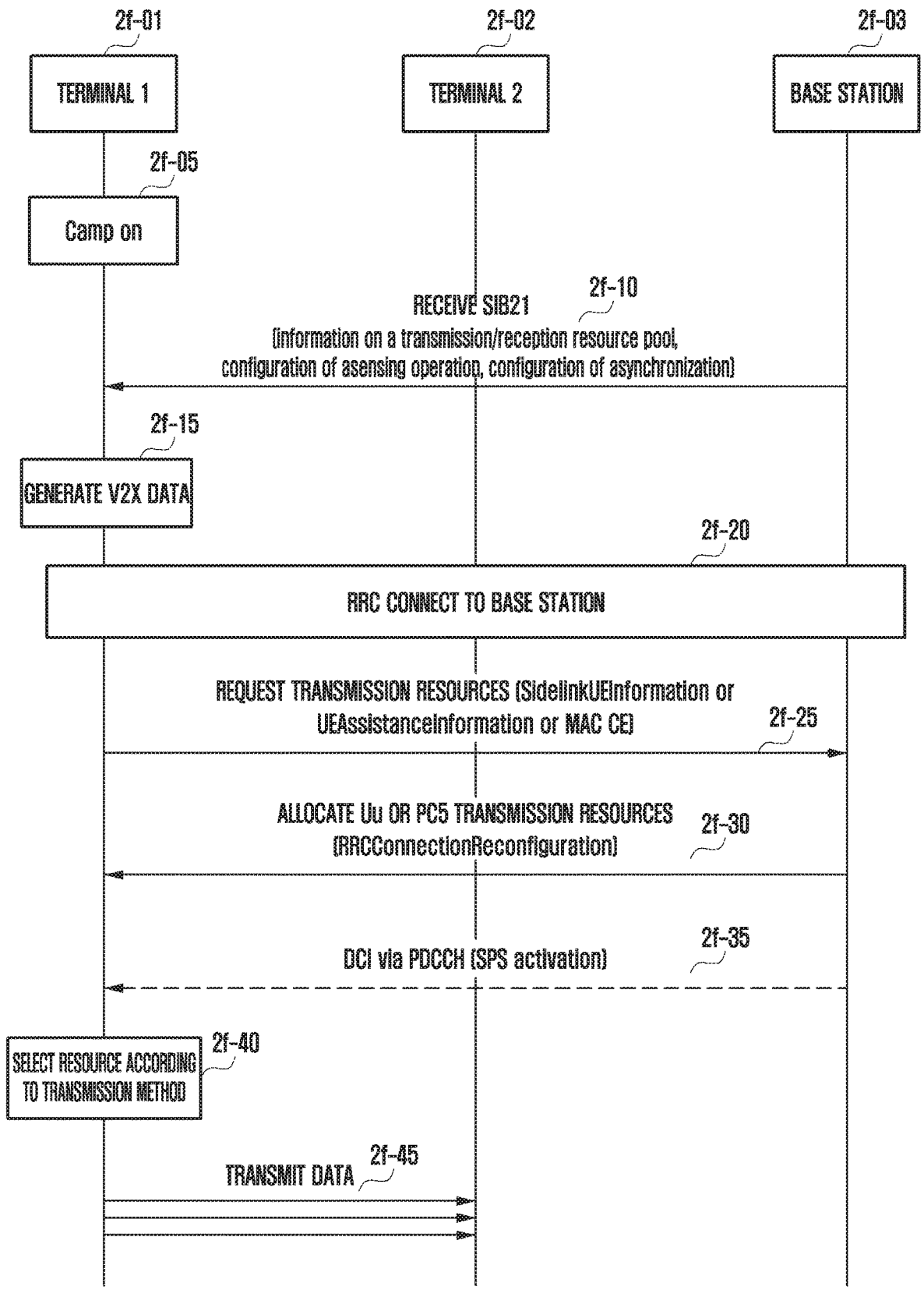
FIG. 2F is a view illustrating a data transmission procedure of a V2X terminal operating in mode 3 according to the disclosure.

FIG. 2F is a view illustrating a data transmission procedure of a V2X terminal operating in mode 3 in an LTE system of the disclosure.

Referring to FIG. 2F, terminal 1 2f-01 camping on (2f-05) may receive system information (SIB21) for V2X from the base station 2f-03 (2f-10).

The system information may include at least one of resource pool information for sidelink data transmission/reception, configuration information for a sensing operation, information for configuring synchronization, and information for inter-frequency transmission/reception. When data traffic for V2X is generated in terminal 1 2f-01 (2f-15), RRC connection with the base station may be performed (2f-20). The above RRC connection process may be performed before data traffic is generated (2f-15).

The terminal 1 2f-01 requests a transmission resource capable of V2X communication with other terminals 2f-02 from the base station (2f-25). At this time, the base station may be requested by using an RRC message or MAC CE. Here, the RRC message may be a SidelinkUEInformation or UEAssistanceInformation message. Meanwhile, as an example, the MAC CE may be a buffer status report MAC CE of a new format (including at least an indicator indicating that a buffer status report for V2X communication and information on the size of data buffered for sidelink communication).

The base station 2f-03 allocates a V2X transmission resource to the terminal 1 (2f-01) (2f-30). The base station 2f-03 may allocate V2X transmission resources through a dedicated RRC message, and the message may be included in the RRCConnectionReconfiguration message.

The resource allocation may be a V2X resource scheduled from the base station through the Uu interface according to the type of traffic requested by the terminal or whether the corresponding link is congested, or a resource directly selected by the terminal from a resource pool (resource for PC5) provided by the base station. In order to determine the resource allocation, the terminal may add and transmit PPPP or logical channel identifier (LCID) information of the V2X traffic through UEAssistanceInformation or MAC CE. Since the base station also knows information on the resources used by other terminals, the base station schedules a resource requested by the terminal 1 2f-01 among remaining resources.

In addition, when the RRC message includes SPS configuration information through Uu, the base station may activate the SPS by transmitting DCI through the PDCCH (2f-35). Terminal 1 2f-01 may select a transmission link and a resource according to the resource and transmission method allocated from the base station 2f-03 (2f-40), and transmit data to the terminals 2f-02 (2f-45).

Figure 2G:
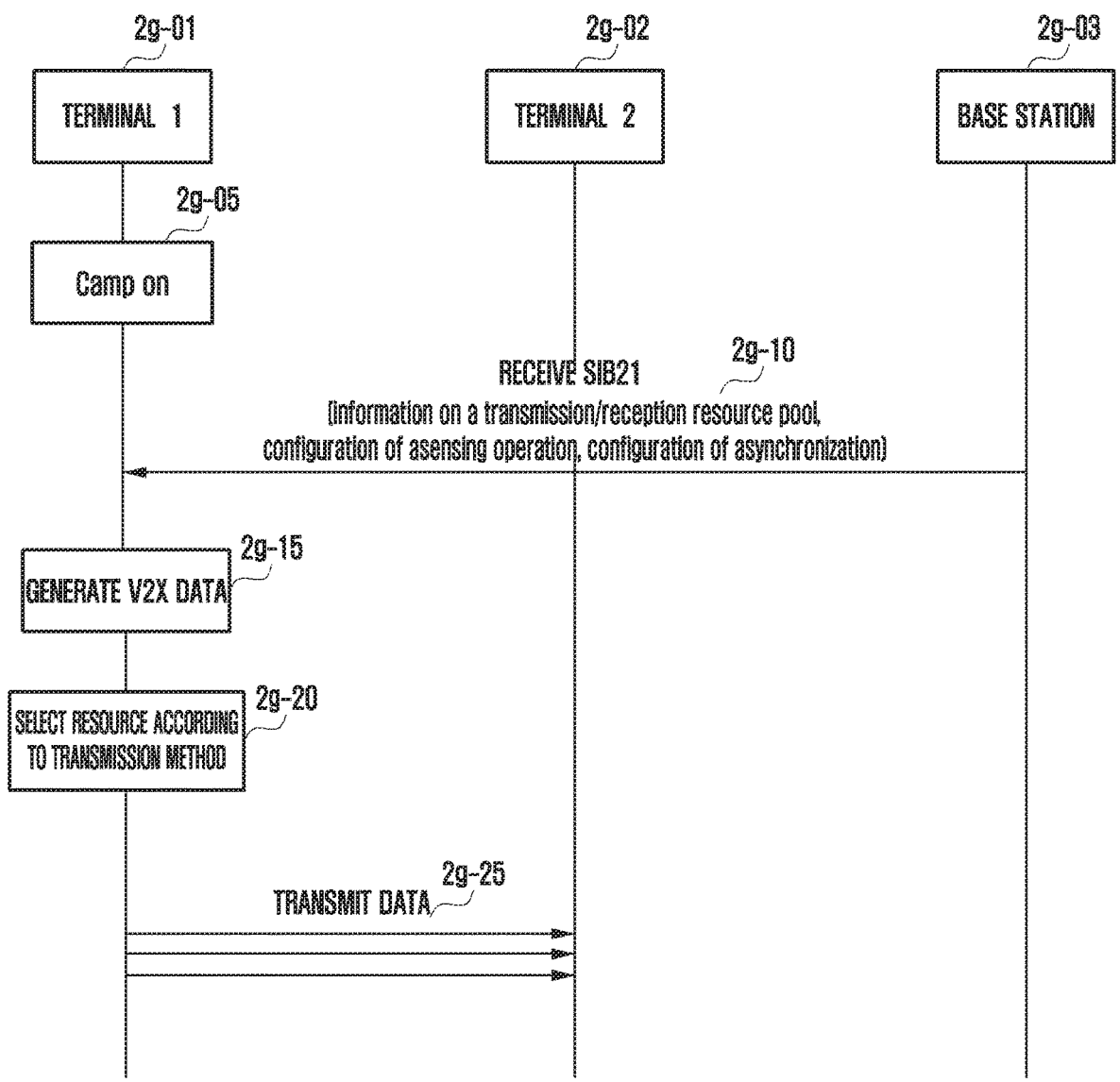
FIG. 2G is a view illustrating a data transmission procedure of a V2X terminal operating in mode 4 according to the disclosure.

FIG. 2G is a view illustrating a data transmission procedure of a V2X terminal operating in mode 4 according to the disclosure.

Unlike mode 3, in which a base station (2g-03) is directly involved in resource allocation, there is a difference in that, in mode 4 operation, terminal 1 2g-01 autonomously selects resources and transmits data based on the resource pool previously received through system information.

In V2X communication, the base station 2g-03 may allocate several types of sidelink resource pools (V2V resource pool, V2P resource pool) for terminal 1 2g-01. The resource pool may consist of a resource pool in which the terminal can autonomously select an available resource pool after sensing resources used by other terminals around it, and a resource pool in which the terminal randomly selects a resource from a preconfigured resource pool.

Referring to FIG. 2G, terminal 1 2g-01 camping on (2g-05) may receive system information SIB21 for V2X (2g-10) from a base station 2g-03.

The system information may include at least one of resource pool information for signal transmission/reception, configuration information for sensing operation, information for configuring synchronization, and information for inter-frequency transmission/reception.

When data traffic for V2X is generated (2g-15) in terminal 1 2g-01, the terminal 1 2g-01 may select a resource in the time/frequency domain (2g-20) and transmit data to other terminals 2g-02 according to the configuration information (transmission operation configured for the resource pool (dynamic allocation one-time transmission, dynamic allocation multiple transmission, sensing-based one-time transmission, sensing-based multiple transmission, random transmission)) received through the system information from the base station 2g-03 (2g-25).

In general, since the V2X service in LTE is implemented for the purpose of periodic transmission of the location information of safety-related terminals, the terminal can perform sensing-based multiple transmission in mode 4 operation. That is, the terminal may sense resources through which signals are transmitted by other terminals, select a transmittable resource block in the resource pool in which the corresponding transmission is performed, and reserve resources so that they can be transmitted periodically thereafter. Thereafter, if the data packet generated by the terminal is changed or disappears, the terminal restarts or cancels the above sensing and resource reservation operation so that a new data packet can be delivered. As described above, sensing and resource reservation-based multi-transmission may be basically operated, and if the sensing operation is not well performed, communication may be performed through random resource selection from a corresponding resource pool.

FIG. 2F and FIG. 2G above summarize the configuration and overall operation of sidelink data transmission and reception in the V2X system, and the packet design, radio bearer configuration, and encryption method in the user plane for the actually transmitted data packets are briefly described in FIG. 2E or some of them are omitted. In order to newly define the NR V2X system, it may be necessary to redefine not only the overall resource pool configuration, but also the packet design in the user plane, radio bearer configuration, and encryption method. In the disclosure, a user plane operation and a radio bearer management overall operation for NR V2X are proposed in a later embodiment.

Figure 2H:
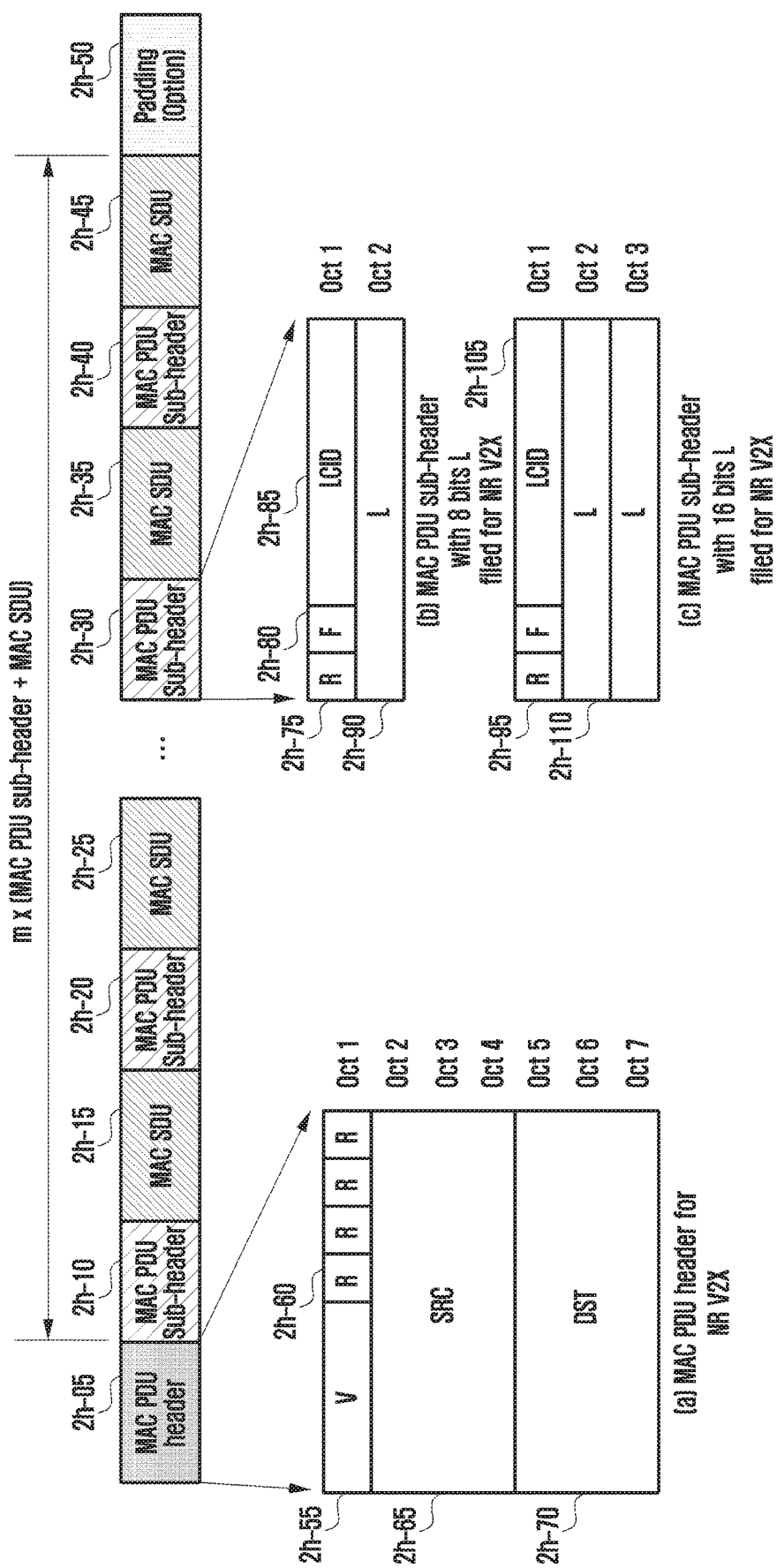
FIG. 2H is a view illustrating a MAC PDU format applied to an NR V2X system proposed in the disclosure.
Figure 21:
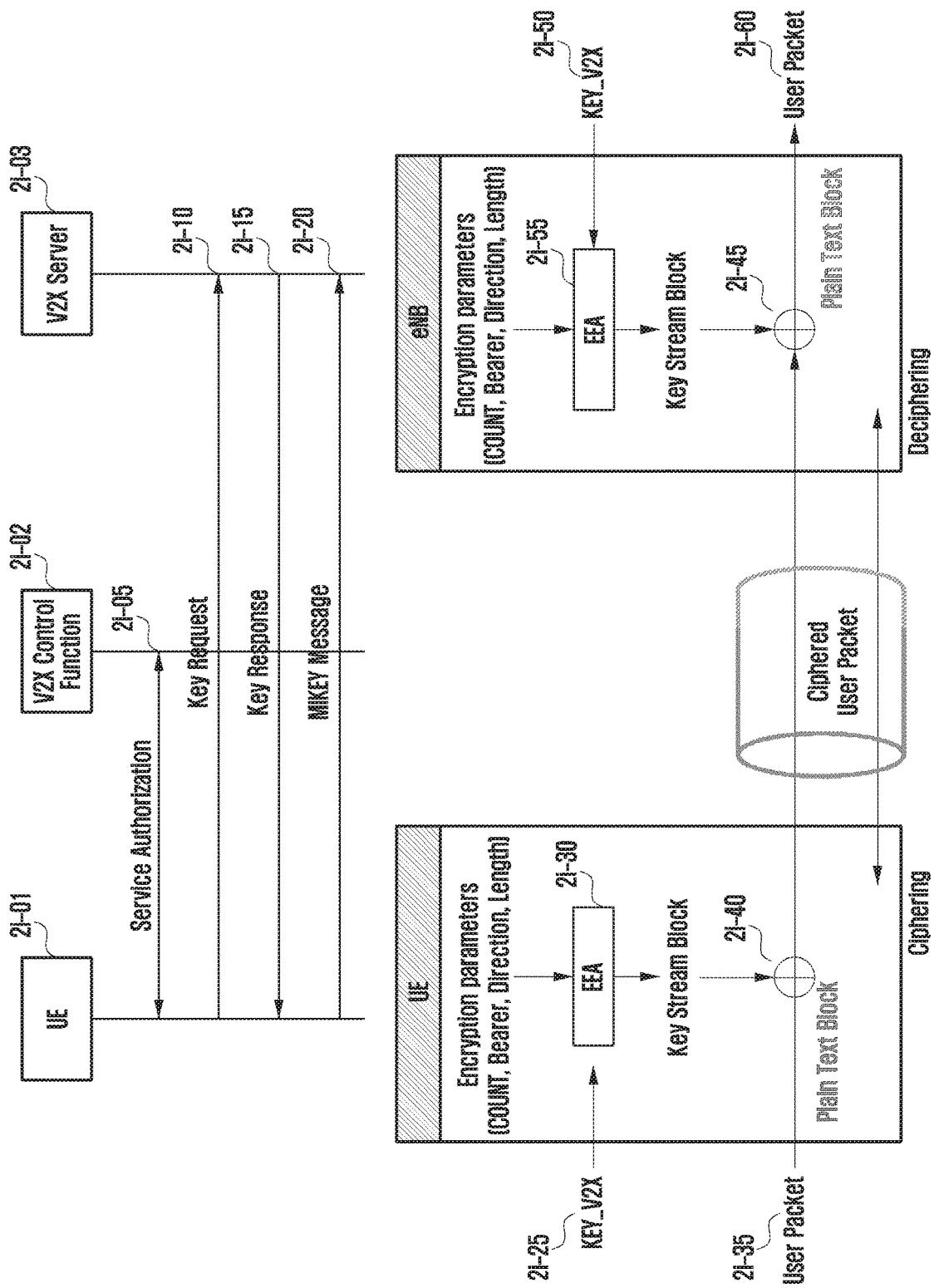

FIG. 2H is a view illustrating a MAC PDU format applied to an NR V2X system proposed in the disclosure.

In addition to the LTE V2X system, the NR V2X system basically presupposes data transmission and reception between the terminal and the terminal as a basic scenario. To this end, a definition of a sidelink different from the existing cellular-based uplink and downlink and a data transmission/reception format through the corresponding sidelink should be determined. When a V2X data packet is actually generated in the terminal, the MAC is configured to transmit MAC PDU through internal PDCP and RLC operation. In general, the RLC and PDCP operations will follow the operation defined in LTE or NR as it is, and it is necessary to apply the actually transmitted MAC PDU configuration according to the sidelink.

The disclosure proposes a transmission format of an NR V2X system, particularly a MAC PDU delivered through a sidelink, and MAC PDUs are largely classified into a MAC PDU header, a MAC PDU sub-header, and a MAC SDU.

First, as can be seen in 2h-05 to 2h-50, the disclosure proposes a structure of a MAC PDU header+m×(MAC PDU sub-header+MAC SDU) as an overall structure of a MAC PDU. Here, m denotes the total number of MAC SDUs and related sub-header transmitted through the MAC PDU, and unlike in the LTE V2X system, a related MAC sub-header is located in front of the MAC SDU for each MAC SDU. For reference, in the LTE V2X system, the MAC PDU has a structure of MAC PDU header+m×MAC PDU sub-header+ m×MAC SDU. In addition, as an option, a padding byte for matching the MAC PDU size may be included.

Through the above MAC PDU structure, the MAC PDU received by the terminal can be sequentially processed at the same time as it is decoded, thereby having an advantage in data processing having a high speed and a high data rate. Currently, LTE V2X data traffic only supports safety-related services including 300 bytes of location information, whereas NR supports various services, especially advanced driving, extended sensor, platooning service, and so on, so that NR V2X requires a higher data rate than LTE V2X. Therefore, the MAC PDU structure proposed above may be helpful for high-speed data processing.

Specifically, looking at the structure of the MAC PDU header in NR V2X proposed by the disclosure in detail, the MAC PDU header has a structure of V/R/SRC/DST.

Here, the V field 2h-55 is a field indicating the version of the corresponding MAC PDU, and may consist of 4 bits. The V field is a field that distinguishes between Rel-12/13 D2D and Rel-14/15 V2X and newly defined NR V2X. The V field may have a different value from the previous Rel-12/13 D2D and Rel-14/15 V2X, and the terminal receiving the same may decode the corresponding field to identify the purpose and method for which the MAC PDU has been delivered.

The R field 2h-60 of the MAC PDU header is a bit reserved for additional functions that can be used later.

The SRC field 2h-65 of the MAC PDU header means a terminal source layer 2 ID of 24 bits, and is mapped to a unique ID specified for each terminal. The corresponding SRC field may be updated and applied when the terminal receives a V2X related parameter from the V2X server, and may be recorded and applied in the own USIM of the terminal.

The DST field 2h-70 of the MAC PDU header means a destination layer 2 ID of 24 bits, and may be mapped to distinguish which service is for each V2X service. In other words, having the same DST value means that the same V2X service is being delivered. However, since NR V2X is not intended for broadcast only, a 24-bit DST may be configured as a unique ID of the terminal to support unicast, or the terminal may be specified through some bits of the 24-bit DST. For example, in 24 bits DST, MSB 16 bits may indicate a service type, and LSB 8 bits may indicate a terminal ID. The DST may be provided through a V2X server and a V2X control function, or may be recorded in a USIM inside the terminal.

Additionally, the structure of the sub-header of the NR V2X MAC PDU may have a structure of R/F/LCID/L.

The MAC PDU sub-header may be used for the purpose of indicating the size of the MAC SDU to be transmitted.

The R fields 2h-75 and 2h-95 of the MAC PDU sub-header are bits reserved for additional functions that can be used later.

The F fields 2h-80 and 2h-100 of the MAC PDU header may serve to indicate the size of the subsequent L fields 2h-90 and 2h-110, if the F field is configured as 0, it may mean that the L field is 8 bits (2h-90), and when the F field is configured as 1, the L field may mean 16 bits (2h-110). Alternatively, it can be configured in reverse.

In addition, the LCID fields 2h-85 and 2h-105 of the MAC PDU sub-header are values for classifying the logical channel type of the transmitted MAC SDU, and may be mapped into a table according to the SL data type and organized. The LCID is determined within the terminal, and the terminal may designate to map V2X traffic generated by a certain LCID.

FIG. 2I is a view illustrating sidelink radio bearer management, encryption and decryption methods applied to the NR V2X system proposed in the disclosure.

If the sidelink radio bearer in NR V2X is defined as a sidelink resource bearer (SLRB), the SLRB may be composed of a PDCP entity and an RLC entity. That is, SLRB=PDCP entity+RLC entity. In this case, one SLRB may be divided into a pair of LCID and SRC/DST. That is, the terminal may establish a new SLRB when receiving an unknown LCID or SRC/DST pair by decoding the contents included in the header and subheader of the MAC PDU packet received from another terminal. The operation of establishing a new SLRB refers to an operation of initializing PDCL/RLC entities constituting the SLRB, and the values of the state/timer variables may be initialized. Specifically, initialization may be performed according to the following procedure.

1. Configuring the T_reassembly (RLC) and T_reordering (PDCP) values to 0 (this means reconfiguring the timer for reassembly and reordering in RLC and PDCP.)

2. Configuring RLC state variables (Since it is possible to receive data from other terminals in V2X, it is necessary not to configure the RLC SN received from the terminal to 0, but based on the RLC SN value of the first received packet.)

A. RX_Next_Reassembly is configured based on the SN of the first received segment B. RX_Next_Highest is configured based on the SN of the first received segment In this case, the terminal may configure based on the RLC SN value received as described above in case of performing V2X communication by broadcast, whereas, in case of performing V2X communication through unicast, a method of configuration as 0 may be used.

3. Configuring PDCP state variables

A. RX_NEXT is configured based on the SN of the PDCP PDU that first received

B. RX_DELIV is configured based on the SN of the first PDCP PDU received

The RX_NEXT indicates the PDCP SN expected to be received next. The initial value can be configured as 0.

RX_DELIV indicates a PDCP SDU that has not been delivered to an upper layer but is waiting for transmission, and an initial value may be configured as 0.

In LTE, since there is no reordering function in the PDCP layer, received packets can be processed regardless of the SN. In this case, the reordering function means that packets received from the PDCP are processed in order and delivered to an upper level. On the other hand, the disclosure proposes a method of configuring PDCP state variables as described above in consideration of reordering in PDCP.

At this time, like the above RLC state variable, the terminal can be configured based on the received PDCP SN value when performing V2X communication by broadcast, whereas in the case of V2X communication through unicast, a method of configuring as 0 can be used.

In addition, in the V2X service, since the service varies according to the destination L2 ID (DST ID), an encryption technique is required that prevents a terminal without authority for the corresponding service from decoding the corresponding data. For example, the SLRB is transmitted for each specific service, and the corresponding SLRB has a root key for encryption for each DST ID. In this case, the actual key for encryption is generated as a root key characterized by the DST ID, and additional information necessary for the actual key may be included in the PDCP header. To this end, different passwords may be applied for each terminal and message (service). More detailed operation follows the following procedure.

The NR V2X terminal 2i-01 may perform a procedure for receiving service authority through the V2X control function 2i-02 to support the NR V2X service (2i-05).

In the above procedure, the V2X control function (2i-02) performs parameter provisioning for NR V2X service, and may transmit DST ID mapping for each service, V2X service supported for each RAT, V2X supportable frequency information, and the like. The above V2X control function (2i-02) receives and has the corresponding information through the V2X server (2i-03) in advance, and when the corresponding terminal attempts to connect, it transmits the corresponding information to the terminal.

Thereafter, the terminal performs a key request to the V2X server for each group (here, the group may be indicated for each DST ID) (2i-10), and the V2X server provides a service key for each DST ID/group (2i-15). In the above, the V2X server providing the key may be a V2X key management function, which may exist inside or outside the V2X server. In the disclosure, for convenience, it is described as a V2X server.

In addition, in step 2i-20, the V2X server performs the procedure of providing the root key. That is, the root key extracted from the DST ID is assigned to the terminal, and the terminal may generate (or derive) an encryption key used for actual encryption by applying the DST ID to the root key. In the above step, the V2X server may also provide expiry time to which the key is applied to the terminal.

When V2X data is generated, the terminal performs an exclusive logical operation (2i-35) on the key stream block obtained through the key generation algorithm (2i-30) for encryption of the terminal and the pure V2X data block to generate a ciphered user packet.

Here, the key stream block for encryption can be obtained after performing a key generation algorithm in which a key for encryption of the user plane obtained from the root key (Key_V2X) (2i-25) and encryption parameters such as COUNT (for example, part of PDCP SN+Key ID), Bearer (Bearer ID), Direction (message delivery direction, 0 or 1), and Length (length of the key stream block) are input as inputs.

The reception terminal receives the encrypted user data packet, performs the same key generation algorithm applied by the terminal, generates the same key stream block as used for encryption, and performs exclusive logical operation (2i-45). Similar to algorithm execution in terminal, in the reception terminal (or applicable to the base station), a key stream block for encryption can be obtained by inputting a key for encryption of the user plane obtained from the Root Key (Key_V2X) (2i-25) and encryption parameters (COUNT, Bearer, Direction, Length (length of the key stream block)) as input parameters.

FIG. 2J is a view illustrating an overall operation of transmitting and receiving data in a user plane in the NR V2X system proposed by the disclosure.

Referring to FIG. 2J, in step 2*j*-10, terminal 1 2*j*-01 supporting NR V2X receives parameters for NR V2X service from V2X server 2*j*-05 (provisioning). At this time, the V2X server 2*j*-05 may transfer parameters related to NR V2X for the terminals to the V2X control function 2*j*-04 in advance, authenticate the terminal and transmit the parameters when the corresponding terminal requests the NR V2X service right in the V2X control function 2*j*-04. The parameters transmitted in the above step may include at least one of the following information.

Frequency information supporting LTE V2X and NR V2X

Mapping information between destination layer-2 ID(s) and V2X service (for example, extended sensor, advanced driving, platooning, etc. are mapped to PSID, ITS-AIDs, etc.)

Mapping between V2X service and V2X supported frequency/RAT (LTE or NR), that is, a service supported by a specific frequency may be specified In step 2*j*-15, the terminal 1 2*j*-01 camps on a V2X frequency supporting service x of interest. The V2X frequency may be a frequency supported by HPLMN (Home PLMN). The frequency may be included in the parameter received in step 2*j*-10.

In step 2*j*-20, the terminal 1 2*j*-01 receives the system information for the V2X service from the base station 2*j*-03 camped on the V2X frequency. The system information may include information capable of performing a V2X operation, and representatively may include resource pool information. In addition, the resource pool information includes a transmission resource pool and a reception resource pool, and the terminal 1 2*j*-01, which received the information in step 2*j*-25, may immediately receive V2X data from another V2X terminal 2 2*j*-02 through the reception resource pool.

In step 2*j*-30, the terminal, which received the V2X MAC PDU from the reception resource pool, decodes the header and sub-header existing in the corresponding MAC PDU, distinguishes which service the received MAC PDU is data for, and performs a first security handling operation (reception packet security application) for the SLRB to which the service is delivered.

The first security handling operation is an operation of decoding data by decoding the received MAC PDU and performing appropriate decoding on a specific SLRB, which will be described in detail in FIGS. 2KA and 2KB.

When data is received through the sidelink and NR V2X data traffic to be transmitted to the terminal 1 occurs at the same time (2*j*-35), the terminal prepares to transmit data through the transmission resource pool received in step 2*j*-20. Before actual data is transmitted, the terminal performs a second security handling operation (transmission packet security application). The second security handling operation is an operation of applying encryption to each SLRB to transmit a data packet to be transmitted, and will be described in detail in FIGS. 2KA and 2KB.

When encryption of the data to be transmitted is completed, a MAC SDU and a header are configured and transmitted according to the MAC PDU format proposed in FIG. 2H (2*j*-45).

Figure 2K:
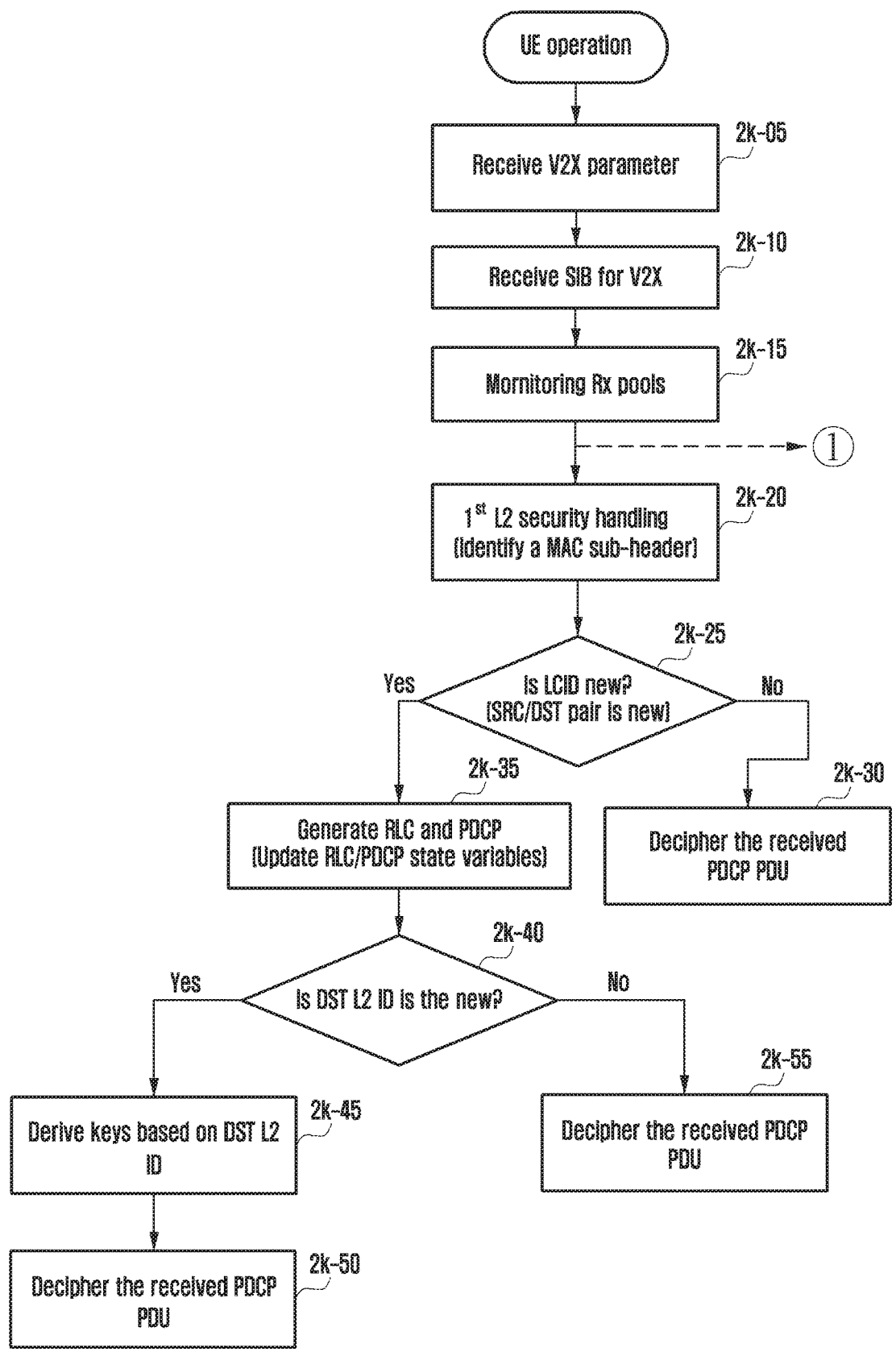
FIGS. 2KA and 2KB are views illustrating in detail a user plane radio bearer management and encryption operation of an NR V2X supporting terminal proposed in an embodiment of the disclosure.
Figure 2K:
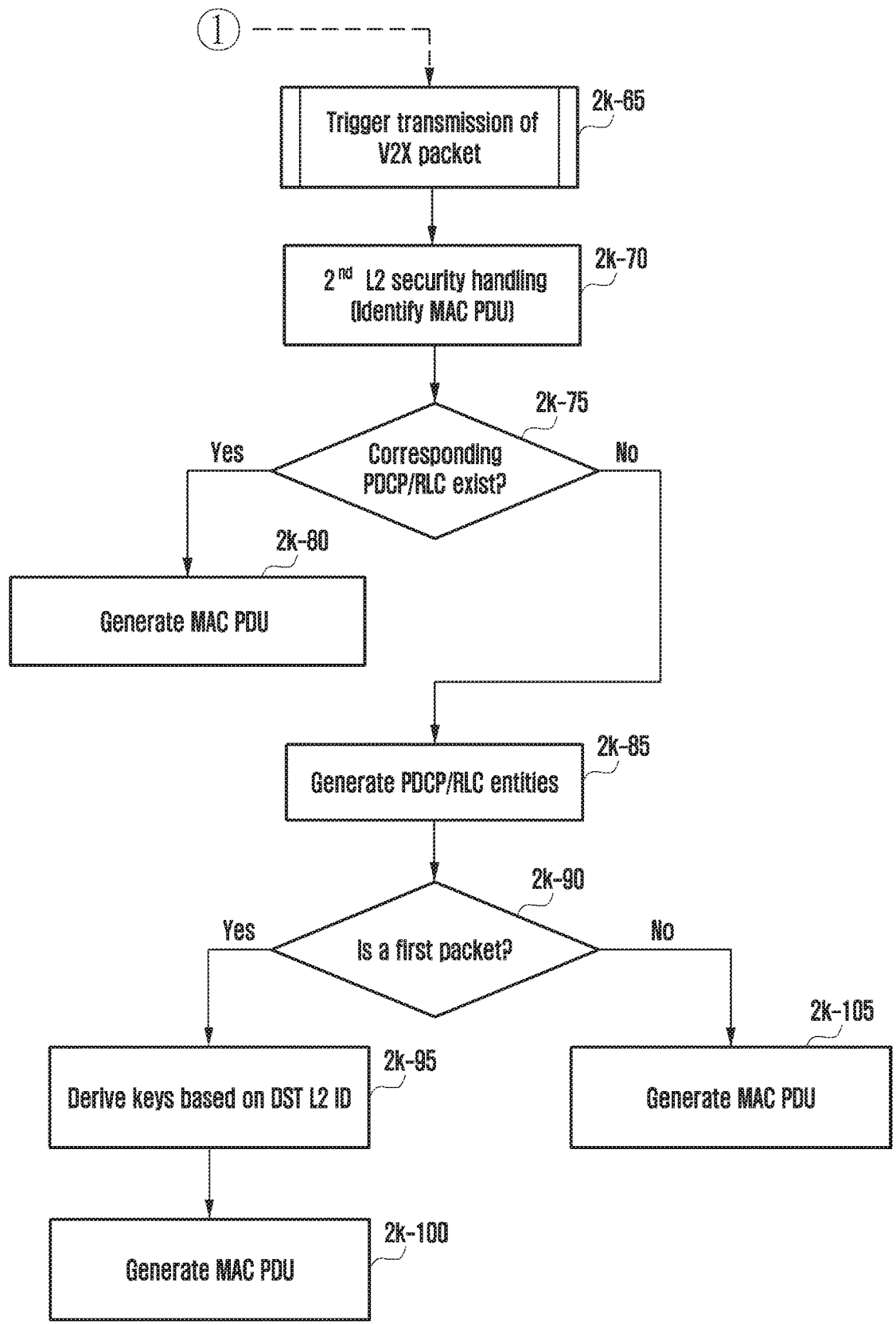

FIGS. 2KA and 2KB are views illustrating in detail a user plane radio bearer management and encryption operation of an NR V2X supporting terminal proposed in an embodiment of the disclosure.

In steps 2*k*-05, the terminal supporting NR V2X receives (or receives provisioning) parameters for the NR V2X service from the V2X server. At this time, the V2X server may transmit NR V2X-related parameters for terminals to the V2X control function in advance, and when the terminal requests NR V2X service authorization in the V2X Control Function, the terminal may be authenticated and parameters may be delivered. The parameters transmitted in the above step have been described in detail in FIG. 2*j*.

The terminal camps on a V2X frequency that supports the V2X service x of interest. The V2X frequency may be a frequency supported by HPLMN. A terminal camping on the V2X frequency receives system information for a V2X service from a corresponding base station in step 2*k*-10.

The system information may include information capable of performing a V2X operation, and representatively may include resource pool information. Also, the resource pool information may include a transmission resource pool and a reception resource pool.

Accordingly, the terminal receiving the corresponding information may monitors the reception resource pool in step 2*j*-15, and immediately receive V2X data from another V2X terminal through the reception resource pool.

When the terminal receives the NR V2X sidelink data packet, in step 2*k*-20, the terminal processes the received MAC PDU and performs a first security handling operation for transferring the received MAC PDU to an upper layer. In other words, the terminal may determine the service type of the received packet by identifying the header and sub-header of the received MAC PDU. The terminal may distinguish whether the corresponding packet is a new service or an existing service and operate accordingly.

In step 2*k*-25, the terminal identifies whether there is a new LCID or a new SRC/DST pair in the subheader of the received MAC PDU.

If both conditions are not satisfied, the terminal decodes the corresponding received packet in step 2*k*-30. That is, the terminal maps the received packet to an existing SLRB separated from the LCID and SRC/DST, and decodes the data by applying a decryption key applied to the SLRB. In particular, when data decoding is performed in the above step, the root key obtained from the DST ID and additional information for decoding included in the PDCP packet header are used.

If the terminal satisfies any of the two conditions in step 2*k*-25, the terminal determines that the packet is indicated as a new service in step 2*k*-35 and establishes a new SLRB. In other words, the terminal creates an RLC and PDCP constituting a new SLRB, and initializes (or updates) the RLC/PDCP state variable.

For example, if the received sub PDU is a UMD PDU, the terminal transfers the sub PDU to the RLC entity, and if the sub PDU includes a UMD PDU segment, the RLC state variable is updated. At this time, the RLC state variable (RX_Next_Reassembly, RX_Next_Highest) is configured as the RLC SN included in the received first UMD PDU segment. This is because the MAC PDU received by the terminal from another terminal may not be an initial transmission but may be a transmission having an arbitrary RLC SN.

In step 2*k*-40, it is determined whether the DST of the MAC PDU received by the terminal is first received, and if it corresponds to the first DST ID, that is, a new service, the terminal corresponds to the DST ID received in steps 2k-45. The encryption key is generated through the root key. The key is used for decryption, and the SRC ID can also be applied to the key generation algorithm. In the above step, additionally necessary information, for example, key id information, when obtaining a key used for actual decoding may be included in the header of the receiving PDCP.

When receiving the already applied DST ID again, the terminal decodes the data packet by applying the known decoding key in steps 2k-55.

At the same time as performing the above operation, NR V2X data traffic is generated independently from the terminal, and data can be transmitted through the transmission pool (2k-65).

When the V2X data transmission is triggered, the terminal performs a second security handling operation in steps 2k-70. In other words, the terminal performs a process of generating a MAC PDU for transmitting a data packet to be transmitted.

In steps 2k-75, the terminal may determine whether a data packet to be transmitted can be delivered to a service that is already in use, for example, an established SLRB. That is, the terminal may determine whether there is an SLRB (PDCP/RLC) corresponding to the data packet to be transmitted.

If the service has already been used (i.e., there is a pre-established SLRB), the terminal can generate a PDCP PDU for delivery to the SLRB in steps 2k-80. At this time, the terminal includes key id information, etc., used for PDCP PDU generation, in the PDCP header. Thereafter, the encryption key applied to the SLRB is applied, the PDCP PDU is transmitted to the RLC after encryption, and the MAC PDU is generated and transmitted after adding the RLC header.

If the data traffic to be transmitted by the terminal is for a new service, for example, a packet to be transmitted through a new SLRB, the terminal generates a PDCP/RLC entity in steps 2k-85.

In addition, the terminal may identify whether it is the first packet to be transmitted in steps 2k-90. If it is the first packet, the terminal generates a root key for the packet to be transmitted using the DST ID in steps 2k-95. In addition, the terminal generates an actual encryption key by applying the Root key and SRC ID to a key generation algorithm.

Then, the terminal generates a PDCP PDU delivered to the SLRB in step 2k-100. At this time, the terminal includes the key id information used in the PDCP header. In the above, the terminal transmits the encrypted PDCP PDU to the RLC by applying the generated encryption key, adds the RLC header, and generates and transmits the MAC PDU.

If the packet to be transmitted in steps 2k-90 is not the first, the terminal generates a PDCP packet by applying the encryption key of the SLRB already applied, and generates and transmits a MAC PDU.

Figure 2L:
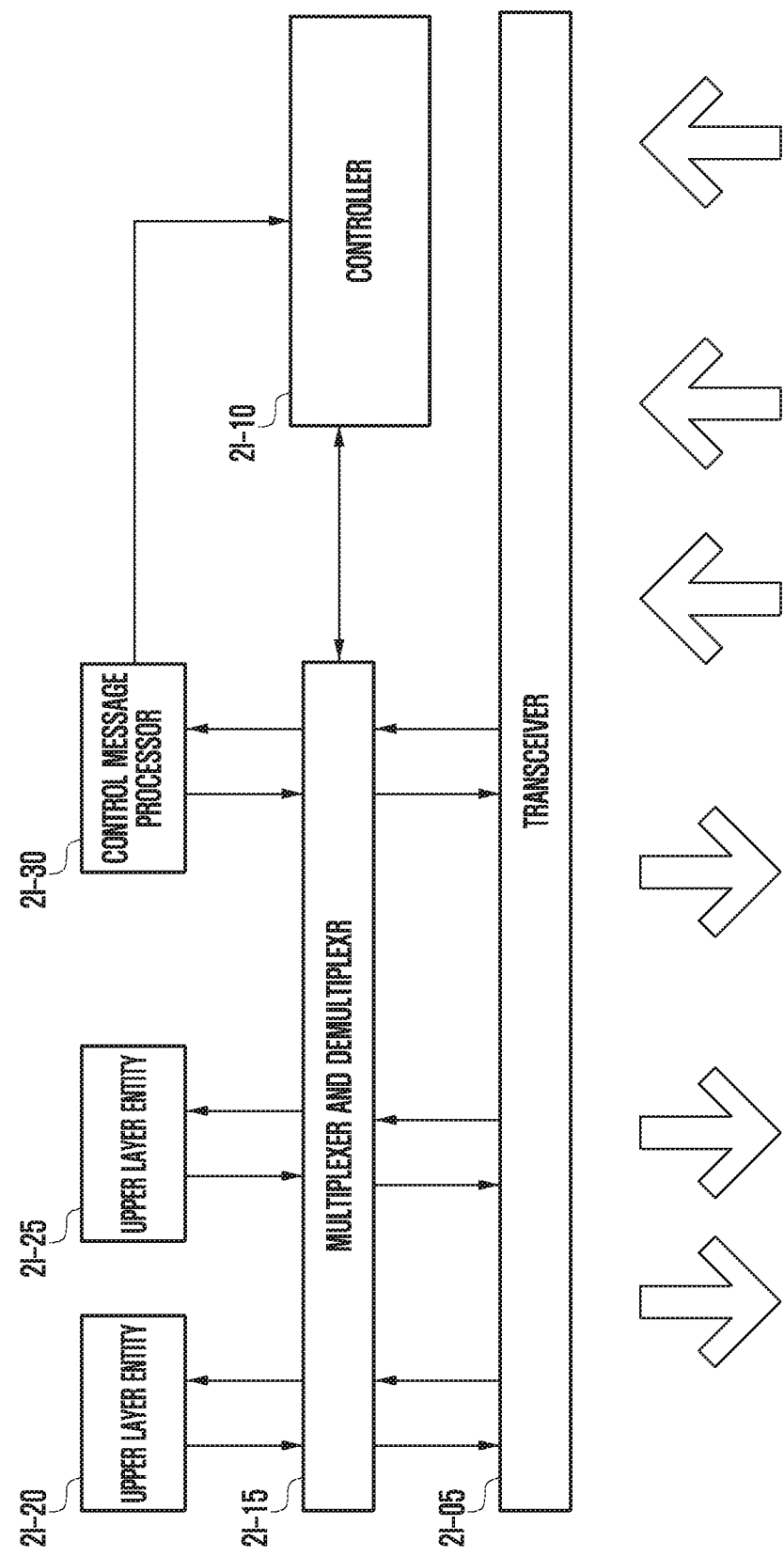
FIG. 2L is a view illustrating a block configuration of a terminal according to an embodiment of the disclosure.

FIG. 2L is a view illustrating a block configuration of a terminal according to an embodiment of the disclosure.

As shown in FIG. 2L, the terminal according to an embodiment of the disclosure includes a transceiver 2l-05, a controller 2l-10, a multiplexing and demultiplexing unit 2l-15, and kinds of upper layer processors 2l-20 and 2l-25, and a control message processor 2l-30.

The transceiver 2l-05 receives data and a predetermined control signal through a forward channel of a serving cell and transmits data and a predetermined control signal through a reverse channel. When a plurality of serving cells are configured, the transceiver 2l-05 performs data transmission/reception and control signal transmission/reception through the plurality of serving cells. The multiplexing and demultiplexing unit 2l-15 multiplexes data generated from the upper layer processing units 2l-20 and 2l-25 or the control message processing unit 2l-30, or demultiplexes the data received from the transmission/reception unit 2l-05 and transfers it to the appropriate upper layer processing units (2l-20, 2l-25) or control message processing units (2l-30). The control message processor 2l-30 transmits and receives a control message from the base station and takes necessary actions. The action includes a function of processing control messages such as RRC messages and MAC CE, reporting of CBR measurement values, and reception of RRC messages for resource pool and terminal operation. The upper layer processors 2l-20 and 2l-25 refer to DRB devices and may be configured for each service. The upper layer processors 2l-20 and 2l-25 process data generated from user services such as file transfer protocol (FTP) or voice over Internet protocol (VoIP) and transfer the processed data to the multiplexing and demultiplexing unit (2l-15), or process the data transmitted from the multiplexing and demultiplexing unit 2l-15 and deliver the processed data to the service application of the upper layer. The controller 2l-10 checks the scheduling commands received through the transceiver 2l-05, for example, reverse grants to control the transceiver 2l-05 and the multiplexing and demultiplexing unit 2l-15 so that reverse transmission is performed with an appropriate transmission resource at an appropriate time. Meanwhile, in the above, it has been described that the terminal is composed of a plurality of blocks and each block performs a different function, but this is only an exemplary embodiment and is not limited thereto. For example, the controller 2l-10 itself may perform a function that the demultiplexer 2l-15 performs.

Figure 2M:
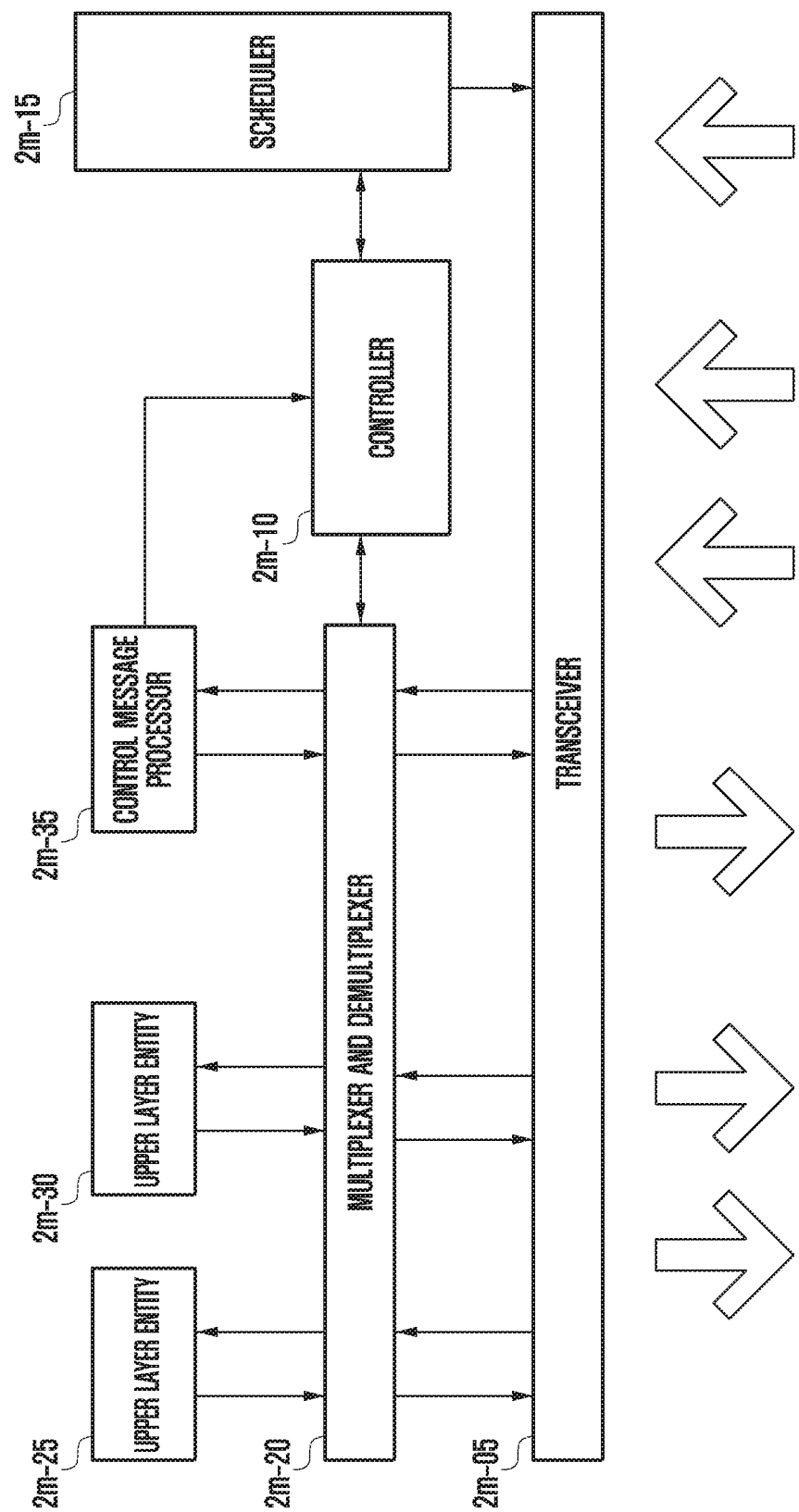
FIG. 2M is a view illustrating a block configuration of a base station according to an embodiment of the disclosure.

FIG. 2M is a view illustrating a block configuration of a base station according to an embodiment of the disclosure.

The base station of FIG. 2M includes a transceiver 2m-05, a controller 2m-10, a multiplexing and demultiplexing unit 2m-20, a control message processor 2m-35, kinds of upper layer processors 2m-25 and 2m-30, and a scheduler 2m-15.

The transceiver 2m-05 transmits data and a predetermined control signal through a forward carrier and receives data and a predetermined control signal through a reverse carrier. When multiple carriers are configured, the transceiver 2m-05 performs data transmission/reception and control signal transmission/reception through the multiple carriers. The multiplexing and demultiplexing unit 2m-20 multiplexes the data generated by the upper layer processors 2m-25 and 2m-30 or the control message processor 2m-35, or demultiplexes the data received from the transceiver 2m-05 to transmit to the data to an appropriate upper layer processors 2m-25 and 2m-30, the control message processor 2m-35, or the controller 2m-10. The control message processor 2m-35 receives an instruction from the controller, generates a message to be transmitted to the terminal, and delivers the generated message to a lower layer. The upper layer processors 2m-25 and 2m-30 may be configured for each terminal service, processes data generated from user services such as FTP or VoIP and transfers the data to the multiplexing and demultiplexing unit 2m-20, or process data transmitted from the multiplexing and demultiplexing unit 2m-20 and deliver the data to the higher layer service application. The scheduler 2m-15 allocates transmission resources to the terminal at an appropriate time in consideration of the terminal's buffer status, channel status, and terminal's active time, and processes the signal transmitted by the terminal to the transceiver or processes the signal to be transmitted to the terminal.

In addition, the disclosure can be summarized as follows.
1. L2 header format for NR V2X
   A. PDU header+m*(sub PDU header+MAC SDU)
   B. PDU header=R/R/R/R/V/SRC/DST
   C. Sub PDU header=R/F/LCID/L
   Reference) L2 header format for LTE V2X
   A. PDU header+m*sub PDU header+m*MAC SDU
   B. PDU header=R/R/R/R/V/SRC/DST
   C. Sub PDU header=R/E/F/LCID/L
2. L2 architecture and state variable/timer handling
   A. One SLRB=PDCP entity+RLC entity
   B. SLRB is identified by LCID and SRC/DST pair)
   C. terminal establishes new SLRB when unknown/new LCID or unknown SRC/DST pair is indicated in the sub PDU header or PDU header
   D. Timer/state variable handling (initialization)
      i. T_reassembly (RLC) and T_reordering (PDCP) are set to zero
      ii. RLC state variables: V2X can receive data from other terminals in the middle
         1. RX_Next_Reassembly set to the SN of the segment received first
         2. RX_Next_Highest set to the SN of the segment received first
      iii. PDCP state variables: V2X can receive data from other terminals in the middle
         1. RX_NEXT set to the SN of the first received PDCP PDU
         2. RX_DELIV set to the SN of the first received PDCP PDU
3. Security key per service
   A. Root key is identified/derived by DST ID
   B. Encryption key is identified/derived by Root key, SRC ID and information in the PDCP header
   (Different passwords can be applied for each device and message)
In Addition, the disclosure can be summarized as follows.
1. UE←V2X server: Parameter provisioning
   The mapping of Destination Layer-2 ID(s) and the V2X services, e.g. PSID, ITS-AIDs, extended sensor, platooning . . . .
   The mapping of services to V2X frequencies/RATs (LTE or NR or both)
2. UE interested in V2X service x: Camping on a V2X frequency of HPLMN mapped to service x
3. UE: Receiving V2X system information and determining the resource pool for reception and resource pool for transmission
4. UE: Receiving MAC PDU in the reception pool
5. UE: L2/Security handling
   For a sub-PDU
      If SRC/DST pair of the MAC PDU is new; or
      LCID of the sub-PDU is new
         Create RLC and PDCP and the forward the sub PDU to the RLC entity
      If sub PDU contains UMD PDU segment, update the RLC state variable accordingly
      Update the PDCP state variable accordingly
   If DST of the MAC PDU is new/received first time
      Derive root key based on the DST L2 ID
      Derive the decryption key based on the root key and SRC ID
      Decipher the received PDCP PDU
6. UE: V2X packet to be transmitted
7. UE: L2/Security handling
   If the corresponding PDCP/RLC does not exist
      Create PDCP entity and RLC entity
   If it is the first packet to be transmitted by the UE for a destination/V2X service
      Derive the root key based on the DST L2 ID
      Derive the encryption key based on the Root key and SRC ID
   Generate PDCP PDU and include the key id in the header
   Encrypt the PDCP PDU data part
   Transmit the PDCP PDU in a MAC PDU In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

The invention claimed is:

1. A method performed by a first terminal in a communication system, the method comprising:
   obtaining a plurality of sidelink medium access control (MAC) service data units (SDUs);
   generating a sidelink MAC protocol data unit (PDU) including a sidelink MAC PDU header, a first sidelink MAC subheader, a first sidelink MAC SDU, a second sidelink MAC subheader, and a second sidelink MAC SDU, wherein the first sidelink MAC SDU is placed in front of the second sidelink MAC subheader and the second sidelink MAC SDU; and
   transmitting, to a second terminal, the sidelink MAC PDU,
   wherein each of the first sidelink MAC subheader and the second sidelink MAC subheader includes a logical channel ID (LCID) field identifying a logical channel, a length field indicating a length of a sidelink MAC SDU, and a format field indicating a size of the length field, and
   wherein a first value of the format field indicates 8 bits of the length field, and a second value of the format field indicates 16 bits of the length field.

2. The method of claim 1,
   wherein the sidelink MAC PDU header further includes a version field indicating a version of the sidelink MAC PDU, and
   wherein a bit size of the version field is 4 bits.

3. A method performed by a second terminal in a communication system, the method comprising:
- receiving, from a first terminal, a sidelink medium access control (MAC) protocol data unit (PDU); and
- identifying a sidelink MAC PDU header, a first sidelink MAC subheader, a first sidelink MAC service data unit (SDU), a second sidelink MAC subheader, and a second sidelink MAC SDU from the sidelink MAC PDU,
- wherein the first sidelink MAC SDU is placed in front of the second sidelink MAC subheader and the second sidelink MAC SDU,
- wherein each of the first sidelink MAC subheader and the second sidelink MAC subheader includes a logical channel ID (LCID) field identifying a logical channel, a length field indicating a length of a sidelink MAC SDU, and a format field indicating a size of the length field, and
- wherein a first value of the format field indicates 8 bits of the length field, and a second value of the format field indicates 16 bits of the length field.

4. The method of claim 3,
- wherein the sidelink MAC PDU header further includes a version field indicating a version of the sidelink MAC PDU, and
- wherein a bit size of the version field is 4 bits.

5. The method of claim 3, wherein a state variable for a packet data convergence protocol (PDCP) entity is set to a sequence number of a first received PDCP data PDU associated with the sidelink MAC PDU.

6. A first terminal in a communication system, the first terminal comprising:
- a transceiver; and
- a controller coupled with the transceiver and configured to:
  - obtain a plurality of sidelink medium access control (MAC) service data units (SDUs),
  - generate a sidelink MAC protocol data unit (PDU) including a sidelink MAC PDU header, a first sidelink MAC subheader, a first sidelink MAC SDU, a second sidelink MAC subheader, and a second sidelink MAC SDU, wherein the first sidelink MAC SDU is placed in front of the second sidelink MAC subheader and the second sidelink MAC SDU, and
  - transmit, to a second terminal, the sidelink MAC PDU,
- wherein each of the first sidelink MAC subheader and the second sidelink MAC subheader includes a logical channel ID (LCID) field identifying a logical channel, a length field indicating a length of a sidelink MAC SDU, and a format field indicating a size of the length field, and
- wherein a first value of the format field indicates 8 bits of the length field, and a second value of the format field indicates 16 bits of the length field.

7. The first terminal of claim 6,
- wherein the sidelink MAC PDU header further includes a version field indicating a version of the sidelink MAC PDU, and
- wherein a bit size of the version field is 4 bits.

8. A second terminal in a communication system, the second terminal comprising:
- a transceiver; and
- a controller coupled with the transceiver and configured to:
  - receive, from a first terminal, a sidelink medium access control (MAC) protocol data unit (PDU), and
  - identify a sidelink MAC PDU header, a first sidelink MAC subheader, a first sidelink MAC service data unit (SDU), a second sidelink MAC subheader, and a second sidelink MAC SDU from the sidelink MAC PDU,
- wherein the first sidelink MAC SDU is placed in front of the second sidelink MAC subheader and the second sidelink MAC SDU,
- wherein each of the first sidelink MAC subheader and the second sidelink MAC subheader includes a logical channel ID (LCID) field identifying a logical channel, a length field indicating a length of a sidelink MAC SDU, and a format field indicating a size of the length field, and
- wherein a first value of the format field indicates 8 bits of the length field, and a second value of the format field indicates 16 bits of the length field.

9. The second terminal of claim 8,
- wherein the sidelink MAC PDU header further includes a version field indicating a version of the sidelink MAC PDU, and
- wherein a bit size of the version field is 4 bits.

10. The second terminal of claim 8, wherein a state variable for a packet data convergence protocol (PDCP) entity is set to a sequence number of a first received PDCP data PDU associated with the sidelink MAC PDU.

* * * * *